(12) United States Patent
Singh et al.

(10) Patent No.: US 11,416,138 B2
(45) Date of Patent: Aug. 16, 2022

(54) DEVICES AND METHODS FOR FAST NAVIGATION IN A MULTI-ATTRIBUTED SEARCH SPACE OF ELECTRONIC DEVICES

(71) Applicants: Gaganpreet Singh, Markham (CA); Qiang Xu, Thornhill (CA); Wei Li, Markham (CA)

(72) Inventors: Gaganpreet Singh, Markham (CA); Qiang Xu, Thornhill (CA); Wei Li, Markham (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/119,853

(22) Filed: Dec. 11, 2020

(65) Prior Publication Data

US 2022/0187983 A1 Jun. 16, 2022

(51) Int. Cl.
*G06F 3/04883* (2022.01)
*G06F 3/0482* (2013.01)
*G06F 3/04855* (2022.01)

(52) U.S. Cl.
CPC ........ *G06F 3/04883* (2013.01); *G06F 3/0482* (2013.01); *G06F 3/04855* (2013.01)

(58) Field of Classification Search
CPC . G06F 3/04883; G06F 3/04855; G06F 3/0482
See application file for complete search history.

(56) References Cited

U.S. PATENT DOCUMENTS

| 9,268,424 | B2 * | 2/2016 | Hatanaka | G06F 3/0412 |
| 10,168,864 | B2 * | 1/2019 | Holt | G06F 3/0482 |
| 2011/0314400 | A1 * | 12/2011 | Mital | G06F 16/26 715/771 |

(Continued)

FOREIGN PATENT DOCUMENTS

| CN | 101107603 A | 1/2008 |
| CN | 103631844 A | 3/2014 |

(Continued)

OTHER PUBLICATIONS

Appert, Caroline, and Fekete, Jean-Daniel. OrthoZoom Scroller: 1D Multi-scale Navigation. In Proceedings of the SIGCHI Conference on Human Factors in Computing Systems (CHI '06), 21-30. https://doi.org/10.1145/1124776 2006.

*Primary Examiner* — Michael Roswell

(57) ABSTRACT

Methods of detection of swipe gestures and filtering and locating desired information in a multi-attributed search space in response to detection of swipe gestures and devices for performing the same are provided. The method includes activating an attribute associated with at least one element of a list of elements having a visible list portion rendered on the viewing area, in response to receiving an activation input for the attribute and displaying a plurality of attribute field controls associated with the attribute, in response to its activation. The method further includes receiving a manipulation action of at least one attribute field control, updating an attribute value in response to the manipulation action, and updating the visible list portion based on the attribute value. The method may be used with touchscreen displays, and with virtual or augmented reality displays.

16 Claims, 33 Drawing Sheets

(56) References Cited

U.S. PATENT DOCUMENTS

| | | | |
|---|---|---|---|
| 2015/0293942 A1* | 10/2015 | Cady | G06F 16/532 |
| | | | 707/722 |
| 2017/0199661 A1* | 7/2017 | Murphy | G06F 3/04886 |
| 2017/0235445 A1 | 8/2017 | Kim et al. | |
| 2017/0242913 A1* | 8/2017 | Tijssen | G06F 40/247 |
| 2019/0232500 A1* | 8/2019 | Bennett | G05B 19/409 |
| 2020/0218546 A1* | 7/2020 | Aggarwal | H04L 9/0643 |
| 2020/0356590 A1* | 11/2020 | Clarke | G06F 16/438 |

FOREIGN PATENT DOCUMENTS

| | | |
|---|---|---|
| CN | 106649784 A | 5/2017 |
| CN | 108235765 A | 6/2018 |
| CN | 111373724 A | 7/2020 |

\* cited by examiner

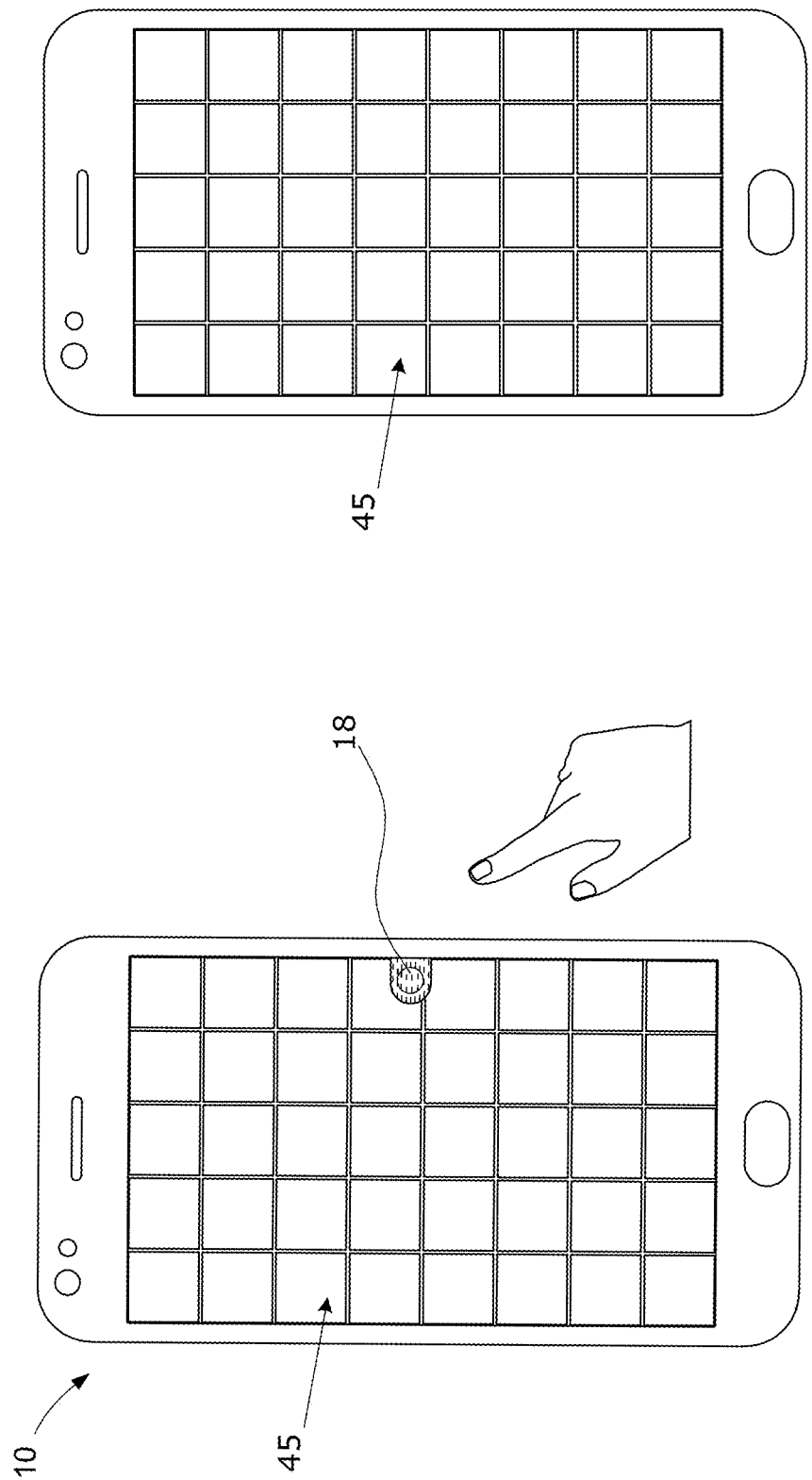

DEVICES AND METHODS FOR FAST NAVIGATION IN A MULTI-ATTRIBUTED SEARCH SPACE OF ELECTRONIC DEVICES

FIELD

This disclosure relates generally to displaying lists of elements on displays of electronic devices and scrolling therethrough. More specifically, the disclosure relates to methods of detection of swipe gestures and filtering and locating desired information in a multi-attributed search space in response to detection of swipe gestures, and devices for performing the same.

BACKGROUND

Electronic devices often have touchscreen displays for displaying content in a viewing area thereof and for enabling user interaction with the electronic device. Content displayed on a touchscreen display may be in the form of a long list of elements which does not fit entirely in the viewing area of the touchscreen display. Scrolling is the action of moving displayed content (e.g. elements of a long list), such as text or graphics, up, down, or across a viewing area in order to view different elements of the long list. Scrolling is useful for locating desired element (e.g. text or graphics) in the long list of elements by scrolling at a faster rate.

Scrolling on traditional computer screens has relied mainly on scrollbars. A scrollbar is a user interface control element by which content, such as continuous text, images, or graphics can be scrolled in a predetermined direction, such us up, down, left or right. The content is scrolled so that all of the content can be viewed even if only a portion of the content fits in the viewing area of a display. A traditional scrollbar includes a track and a draggable scrolling element, such as a thumb, which can be dragged along the track to move the content, such as body of a document or elements of a list of elements, through a viewing area of a display. Dragging the draggable scrolling element along the track when the scrollbar is displayed on a touchscreen display is typically done by a user touching the draggable scrolling element with a finger to select the draggable scrolling element and then dragging their finger along the track which causes the draggable scrolling element to move along the track. Typically a scrollbar is located along one edge of the viewing area of the display so the draggable does not interfere with displayed content.

Scrollbars with draggable scrolling elements have limitations when scrolling through a long list of elements. When the scrolling element is at a top position on the track, this corresponds to the first element of the list of elements to be displayed. Similarly, when the scrolling element is at a bottom position on the track, this corresponds to the last element of the list of elements to be displayed. Screen size and resolution pose problems when the range between the first and last elements is large. For example, if the number of elements being displayed is at least an order of magnitude of the screen resolution, continuous scrolling which allows the viewing or selection of a single element becomes impossible as scrolling by even one pixel represents scrolling through ten or more elements. The OrthoZoom Scroller proposed by Appert and Fekete teaches swiping the scrolling element in a direction which is orthogonal to the axis of the track of a scrollbar in order to zoom in and permit continuous scrolling of a list of elements. In use, the scrolling element is dragged along the track to pan along a list of elements. Then the scrolling element is dragged away from the track in an orthogonal direction to zoom in and change the scrolling scale to a finer granularity. The scrolling element may then be dragged in a direction parallel to the track to continuously scroll using the finer granularity along a subset of the range so that a particular single element may be viewed or selected. However, Orthozoom Scroller only scales the scrolling but does not deal with elements having multiple attributes. Looking for a particular element in the list of elements still involves panning and scrolling through every element in the list.

Some applications display data, whether textual or graphical in the form of a long list of elements, wherein each element is multi-attributed in nature. For example an application such as Google Photos displays a list of photos typically sorted by the date attributes of the photos. The Google Photos application provides a traditional touch flick method of scrolling in which a human finger or touch input tool is flicked either upwardly or downwardly on the screen to cause the content of the application's viewing area to scroll through the photos or videos being displayed. The Google Photos application also provides a scrubber user interface element as an alternate method of scrolling through content. The scrubber interface is described in more detail below. Scrolling through the photos using the scrubber is faster than traditional touch flicks as it allows skipping by a month at a time. However, the scrubber only allows scrolling using the time attribute of the photos, and does not take into account other attributes associated with the photos such as content and location.

There is a need for a more versatile way of scrolling through and locating elements in a long list of elements displayed on touchscreen displays.

SUMMARY

In some of the aspects of the present disclosure, the ability to scroll in a hierarchical manner and based on different attributes of the elements of a long list may improve the operation of an electronic device. For example, facilitating more efficient user interactions with an electronic device through the hierarchical scrolling may enable locating an element with fewer, and more accurate interactions. Fewer interactions with the electronic device reduce possible wear or damage to the electronic device and possibly reduce battery power consumption.

In one aspect of the present disclosure, there is provided a method performed by an electronic device having a display including a viewing area. The method comprises activating a first attribute associated with at least one element of a list of elements having a visible list portion rendered on the viewing area, in response to receiving a first activation input for the first attribute; displaying a first plurality of attribute field controls associated with the first attribute, on the viewing area, in response to activating the first attribute; and receiving a first manipulation action of at least one attribute field control of the first plurality of attribute field controls. The method further comprises updating a first attribute value in response to the first manipulation action, and updating the visible list portion based on the first attribute value.

In one aspect of the present disclosure, the preceding method may further comprise activating a second attribute associated with at least one element of the list of elements in response to receiving a second activation input for the second attribute; displaying a second plurality of attribute field controls associated with the second attribute, on the viewing area, in response to activating the second attribute; receiving a second manipulation action of at least one attribute field control of the second plurality of attribute field controls; updating a second attribute value in response to the second manipulation action; and updating the visible list portion based on the first attribute value and the second attribute value. Advantageously, a visible list portion of a list may be updated based on two attribute values which can lead to displaying a desired number of elements with minimal scrolling or input of filtering conditions.

In one aspect of the present disclosure, in the preceding method, the first attribute may be an ordinal attribute, updating the first attribute value may comprise incrementing or decrementing the first attribute value, and updating the visible list portion may comprise scrolling the viewing area until the visible list portion contains elements matching the first attribute value. Scrolling the viewing area based on a first attribute value which can be updated through a manipulation action of an attribute field control may minimize the need for multiple touch flicks or other scrolling actions that would need to be applied repeatedly until the visible list portion contains the desired elements.

In one aspect of the present disclosure, in the preceding method, the display may be a touchscreen display and the first manipulation action may comprise upwardly or downwardly in relation to the attribute field control.

In one aspect of the present disclosure, in the preceding method, the first attribute may be a nominal attribute, the first plurality of field controls each contains a possible value for the first attribute, updating the first attribute value may comprise setting the first attribute value to the possible value of the attribute field control receiving the manipulation action, and updating the visible list portion may comprise displaying only elements of the visible list portion which have the first attribute value. Advantageously, a list of elements may be filtered based on one or more attributes without the need to enter complex Boolean conditions. This simplifies the user interface and may lead to less use of input peripherals and less use of the processing power of the processing device.

In one aspect of the present disclosure, in the preceding method, the first manipulation action may comprise swiping to an attribute field control then lifting off therefrom. The action is simple and intuitive.

In one aspect of the present disclosure, in the preceding method, the display may comprise a touchscreen display. The viewing area may have a scrubber and an around scrubber area (ASA) rendered thereon near a one edge of the touchscreen display. The viewing area may have an attribute selection view, comprised of a plurality of attribute selection elements, rendered along an opposite edge of the touchscreen display. The first activation input may comprise a swipe from the around scrubber area towards an attribute selection element. Advantageously, a single swipe may be used to both activate an attribute and manipulate attribute field controls to update the selected attribute's value. The first attribute may be activated when the swipe reaches a selection distance threshold line. In addition to being a simple gesture, not touch flicks or repeated swiping actions are necessary. This reduces wear on the touchscreen display which would otherwise have to undergo repeated pressure when receiving touch flicks for example.

In one aspect of the present disclosure, in the preceding method, the display may comprise a touchscreen display, the viewing area may have an attribute activation view, comprised of a plurality of attribute activation elements, rendered along an edge of the touchscreen display, and the first activation input comprises touching an attribute activation element corresponding to the first attribute then swiping away from attribute activation view. Advantageously, selecting an attribute to activate is simplified and swiping away is a distinct gesture that will not be confused with a vertical swipe. This reduces the chance of an accidental scrolling before selecting the attribute value which would require additional interactions to cancel the accidental scrolling. Unnecessary interactions with the touchscreen display are therefore minimized thus reducing wear on the touch sensing mechanisms and reducing battery power consumption.

In one aspect of the present disclosure, in the preceding method, the attribute view may be semi-oval and is rendered in response to touching a scrubber, which advantageously does not permanently take up much space in the viewing area. This averts the need to make the touchscreen display larger to view the same content, thus reducing cost. Additionally, a larger touchscreen display consumes more battery power, hence efficiently using the viewing area results in battery power saving.

In one aspect of the present disclosure, in the preceding method, the display may comprise a touchscreen display and the viewing area may have an attribute activation view comprised of a plurality of attribute activation elements, rendered along an edge of the touchscreen display, and scrollable in the vertical direction in response to touch flicks. The viewing area may have a scrubber rendered thereon, the scrubber being aligned with one the plurality of attribute activation elements. The first activation input may comprise applying at least one touch flick to the attribute activation view until an attribute activation element associated with the first attribute is aligned with the scrubber, and touching the scrubber.

In one aspect of the present disclosure, in the preceding method, the display may be an augmented reality display, and a scrubber may be rendered on the viewing area. The first activation input may comprise a pinch and grab air gesture of the scrubber to expand the scrubber into an attribute activation view comprising a plurality of attribute activation elements, and swiping in mid-air towards an attribute activation element of the plurality of attribute activation elements. Using a pinch and grab air gesture is intuitive for interacting with an augmented reality display, and showing the attribute activation view only when needed saves viewing area real-estate and may reduce the need to make the display larger thus saving cost and power consumption.

In one aspect of the present disclosure, there is provided an electronic device comprising a display including a viewing area on which there is rendered a visible list portion of a list of elements. The electronic device further comprises a processing device operatively coupled to the display, and a non-transitory memory coupled to the processing device and storing software instructions. The software instructions when executed by the processing device configure the processing device to activate a first attribute associated with a least one element of the list of elements in response to receiving a first activation input, display a first plurality of attribute field controls associated with the first attribute, on the viewing area, in response to activating the first attribute, receive a first manipulation action of at least one attribute field control of the first plurality of attribute field controls, update a first attribute value in response to the first manipulation action, and update the visible list portion based on the first attribute value. In the preceding electronic device, the first attribute may be an ordinal attribute. The instructions may further configure the processing device to update the first attribute value comprises incrementing or decrementing the first attribute value and update the visible list portion comprises scrolling the viewing area until the visible list portion contains elements matching the first attribute value.

In one aspect of the present disclosure, in the preceding electronic device, the first attribute may be a nominal attribute, and the first plurality of field controls may each contain a possible value for the first attribute. The instructions may further configure the processing device to update the first attribute value comprises setting the first attribute value to the possible value of the attribute field control receiving the manipulation action, and update the visible list portion comprises displaying only elements of the visible list portion which have the first attribute value.

In one aspect of the present disclosure, in the preceding electronic device, the instructions may further configure the processing device to activate a second a second attribute associated with at least one element of the list of elements in response to receiving a second activation input for the second attribute, display a second plurality of attribute field controls associated with the second attribute, on the viewing area, in response to activating the second attribute, receive a second manipulation action of at least one attribute field control of the second plurality of attribute field controls, update a second attribute value in response to the second manipulation action, and update the visible list portion based on the first attribute value and the second attribute value.

In one aspect of the present disclosure, in the preceding electronic device, the display may comprise a touchscreen display and the viewing area may have a scrubber and an around scrubber area (ASA) rendered thereon near a one edge of the touchscreen display. The viewing area may have an attribute selection view, comprised of a plurality of attribute selection elements, rendered along an opposite edge of the touchscreen display, and the first activation input may comprise a swipe from the around scrubber area towards an attribute selection element.

In one aspect of the present disclosure, in the preceding electronic device, the display may comprise a touchscreen display. The viewing area may have an attribute activation view, comprised of a plurality of attribute activation elements, rendered along an edge of the touchscreen display, and the first activation input may comprise touching an attribute activation element corresponding to the first attribute then swiping away from attribute activation view.

In one aspect of the present disclosure, in the preceding electronic device, the display may comprise a touchscreen display and the viewing area may have an attribute activation view. The attribute activation view may be comprised of a plurality of attribute activation elements, rendered along an edge of the touchscreen display, and scrollable in the vertical direction in response to touch flicks. The viewing area may have a scrubber rendered thereon, the scrubber being aligned with one the plurality of attribute activation elements. The first activation input may comprise applying at least one touch flick to the attribute activation view until an attribute activation element associated with the first attribute is aligned with the scrubber, and touching the scrubber.

In one aspect of the present disclosure, in the preceding electronic device, the display may be an augmented reality display and a scrubber may be rendered on the viewing area. The first activation input may comprise a pinch and grab air gesture of the scrubber to expand the scrubber into an attribute activation view comprising a plurality of attribute activation elements; and swiping in mid-air towards an attribute activation element of the plurality of attribute activation elements.

In yet another aspect of the present disclosure, there is provided a computer readable medium storing instructions. The instructions when executed by a processor of an electronic device configures the electronic device to activate a first attribute associated with a least one element of the list of elements in response to receiving a first activation input, display a first plurality of attribute field controls associated with the first attribute, on the viewing area, in response to activating the first attribute, receive a first manipulation action of at least one attribute field control of the first plurality of attribute field controls, update a first attribute value in response to the first manipulation action, and update the visible list portion based on the first attribute value.

BRIEF DESCRIPTION OF THE DRAWINGS

Reference will now be made, by way of example, to the accompanying drawings which show example embodiments of the present application, and in which:

FIG. 16 depicts the electronic device of FIG. 12 wherein the attribute activation view has been automatically removed after a period of no use;

FIG. 17 depicts the electronic device of FIG. 16 wherein the scrubber has been automatically removed after a period of no use;

DESCRIPTION OF EXAMPLE EMBODIMENTS

In this disclosure the term "electronic device" refers to an electronic device having computing capabilities. Examples of electronic devices include but are not limited to: personal computers, laptop computers, tablet computers ("tablets"), smartphones, surface computers, augmented reality gear, automated teller machines (ATM)s, point of sale (POS) terminals, and the like.

In this disclosure, the term "display" refer to a hardware component of an electronic device that has a function of displaying graphical images, text, and video content thereon. Non-limiting examples of displays include liquid crystal displays (LCDs), light-emitting diode (LED) displays, and plasma displays.

In this disclosure, a "screen" refers to the outer user-facing layer of a touchscreen display.

In this disclosure, the term "touchscreen display" refers to a combination of a display together with a touch sensing system that is capable of acting as an input device by receiving touch input. Non-limiting examples of touchscreen displays are: capacitive touchscreens, resistive touchscreens, Infrared touchscreens and surface acoustic wave touchscreens.

In this disclosure, the term "touch input tool" refers to a physical device, such as a stylus, used to create or manipulate content displayed on a touchscreen display.

In this disclosure, the term "scrolling gesture" refers to touching and dragging an element displayed on a touchscreen display in a direction to effect scrolling the contents of a viewing area of the touchscreen display.

In this disclosure, the term "touch flick" refers to a gesture in which the screen of a touchscreen display is touched by a human finger or a touch input tool, the finger or touch input tool is briefly swiped in one direction and is then quickly lifted off the screen.

In this disclosure, the term "viewing area" or "view" refers to a region of a display, which may for example be rectangular in shape, which is used to display information and receive touch input.

In this disclosure, the term "viewing area" or "main view" refers to the single viewing area that covers all or substantially all (e.g., greater than 95%) of the viewable area of an entire display area of a touchscreen display.

Figure 1A:
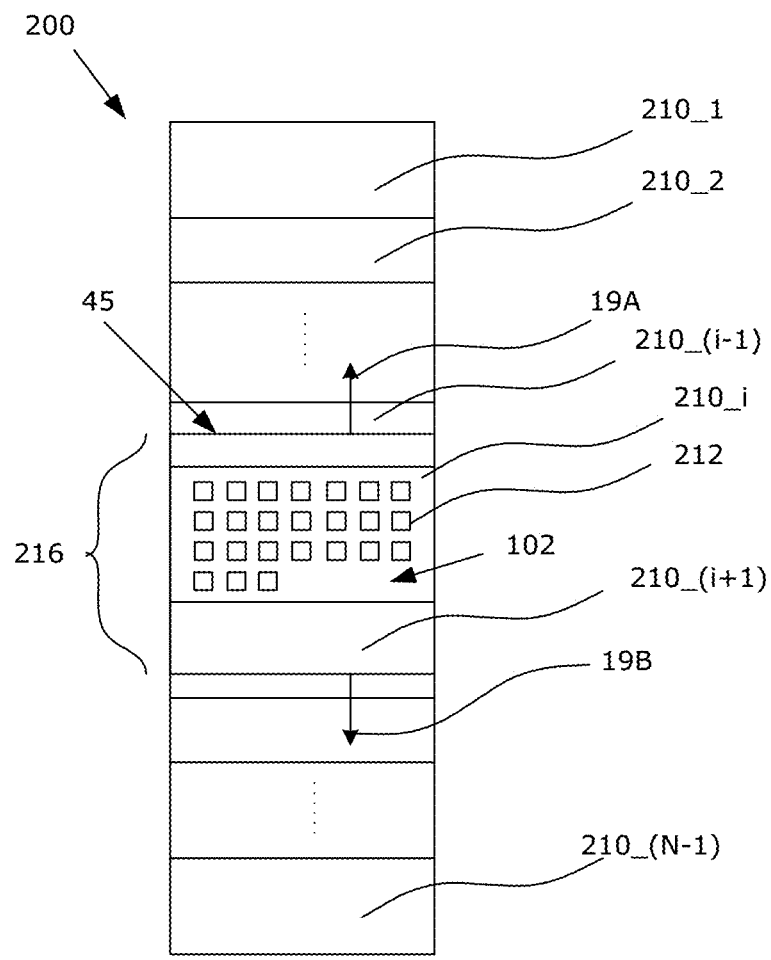
FIG. 1A is a diagram representing a list of elements that may be scrolled up or down a viewing area of a display.

As discussed above in the background section, a list of elements whether graphical or textual, may need to be displayed on a display of an electronic device. FIG. 1A depicts an example list 200 of elements 210 to be viewed on a viewing area 102 of a touchscreen display 45 of an electronic device 10. The depicted list 200 is comprised of (N) elements numbered 210_1 through 210_(N) (collectively "210"). In one example, each element 210 of the list of 200 can be an image, a video, a graphical element or text. In another example, each element 210 can be a group of sub-elements 212. For example an element 210 can be a group of photos taken on a particular date. The viewing area 102 of the touchscreen display 45 can only show a visible list portion 216 of the elements 210 due to size limitations. For example, in the depicted example, only the 3 elements: 210_(i−1), 210_i, and 210_(i+1) can be displayed in the viewing area 102. Element 210_i can be displayed entirely in the viewing area 102, while only portions of the elements 210_(i−1) and 210_(i+1) are displayed in the viewing area 102. Accordingly, to view any of the other elements 210, such as element 2102, which is located within the list 200 and which is above the visible list portion 216, the viewing area 102 of the touchscreen display 45 needs to scroll up the list 200 in the scrolling up direction 19A. Similarly, to view any of the elements 210 which are below the visible list portion 216, the viewing area 102 of the touchscreen display 45 needs to scroll down the list 200 in the scrolling down direction 19B. Conventional methods of scrolling include touch flicks. To scroll the contents of the viewing area 102 of the display using touch flicks the screen of the touchscreen display 45 is touched by a finger, the finger is swiped either in the scrolling up direction 19A or in the scrolling down direction 19B, then the finger is lifted off the screen. Other methods of scrolling are described below.

Figure 1B:
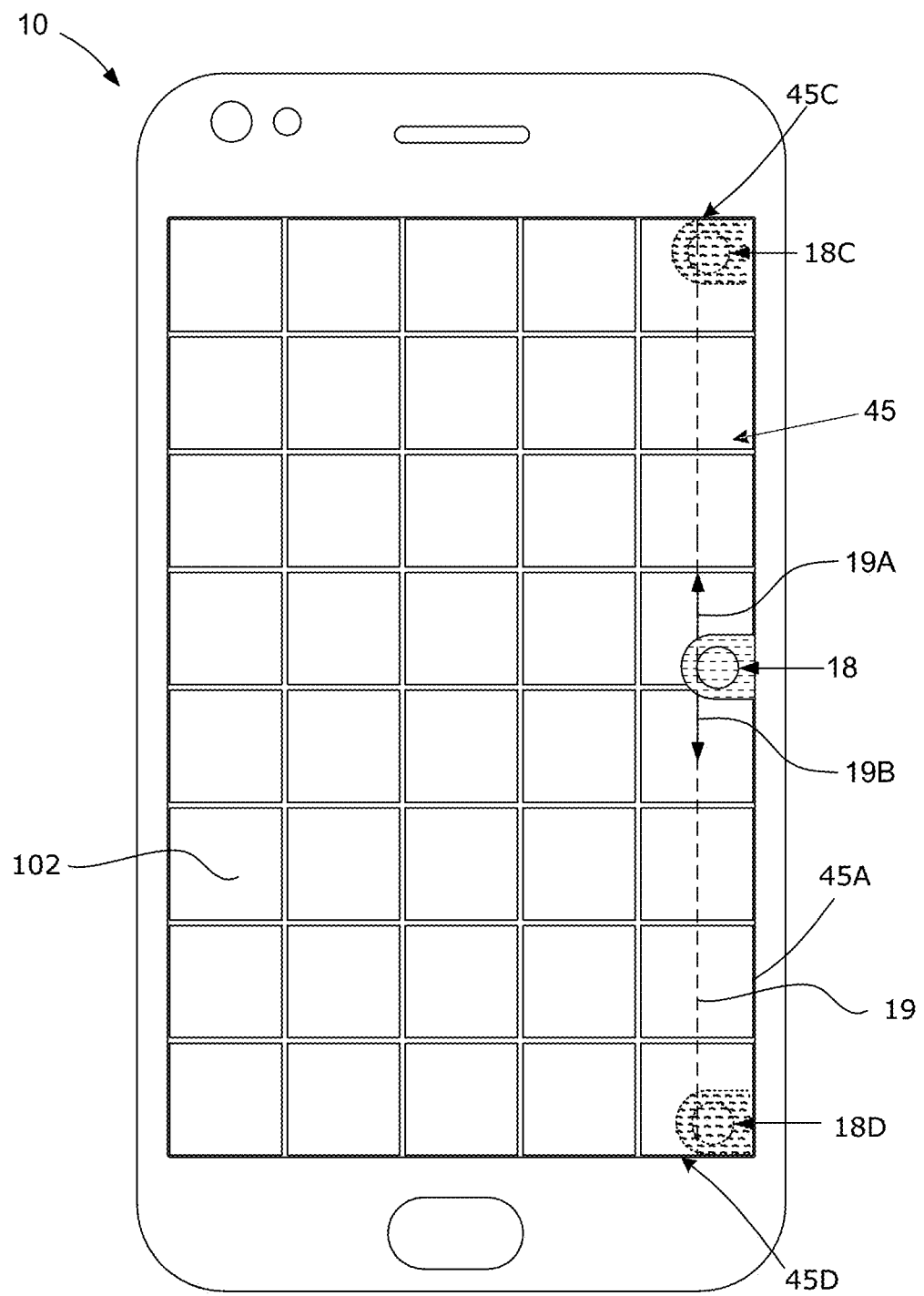
FIG. 1B depicts an electronic device employing a touchscreen display having a viewing area on which a scrubber user interface element is displayed.

One of the other methods of scrolling through a list 200 of elements 210 utilizes a user interface element known as a scrubber 18. FIG. 1B depicts an electronic device 10 including a touchscreen display 45 having a viewing area 102. A scrubber 18 is rendered near a right edge 45A of the touchscreen display 45 on the viewing area 102. The scrubber 18 shown is generally circular or oval in shape and is sized to receive the tip of a finger 30 or a touch input tool. The scrubber 18 can be dragged, by a finger 30 or a touch input tool, along a line 19 that is substantially parallel to the right edge 45A of the touchscreen display 45. For example, the scrubber 18 can be dragged in a scrolling up direction 19A to scroll up the contents rendered on the viewing area 102 of the touchscreen display 45. Dragging the scrubber 18 in the scrolling up direction 19A is termed an "upward scrolling gesture". Similarly, the scrubber 18 can be dragged downwardly in the scrolling down direction 19B, in a "downward scrolling gesture", to scroll down the content rendered on the viewing area 102 of the touchscreen display 45.

In some example embodiments, the contents rendered on the viewing area 102 are updated in real-time as the scrubber 18 is being dragged up or down. In other embodiments, the content rendered on the viewing area remains unchanged until the scrubber 18 is released by lifting the finger 30 or the touch input tool off the screen when the finger 30 or touch input tool is positioned on top of the scrubber 18.

In some embodiments, the position of the scrubber 18 indicates the relative position of the visible list portion 216 with respect to the list 200 being displayed. For example, when the scrubber 18 is at a top-most position, shown as scrubber 18C, near the top edge 45C of the touchscreen display 45, the viewing area 102 displays the elements 210 at the top of the list 200. Conversely, when the scrubber 18 is at a bottom-most position, shown as scrubber 18D, near the bottom edge 45D of the touchscreen display 45, the viewing area 102 displays the elements 210 at the bottom of the list 200.

Figure 2:
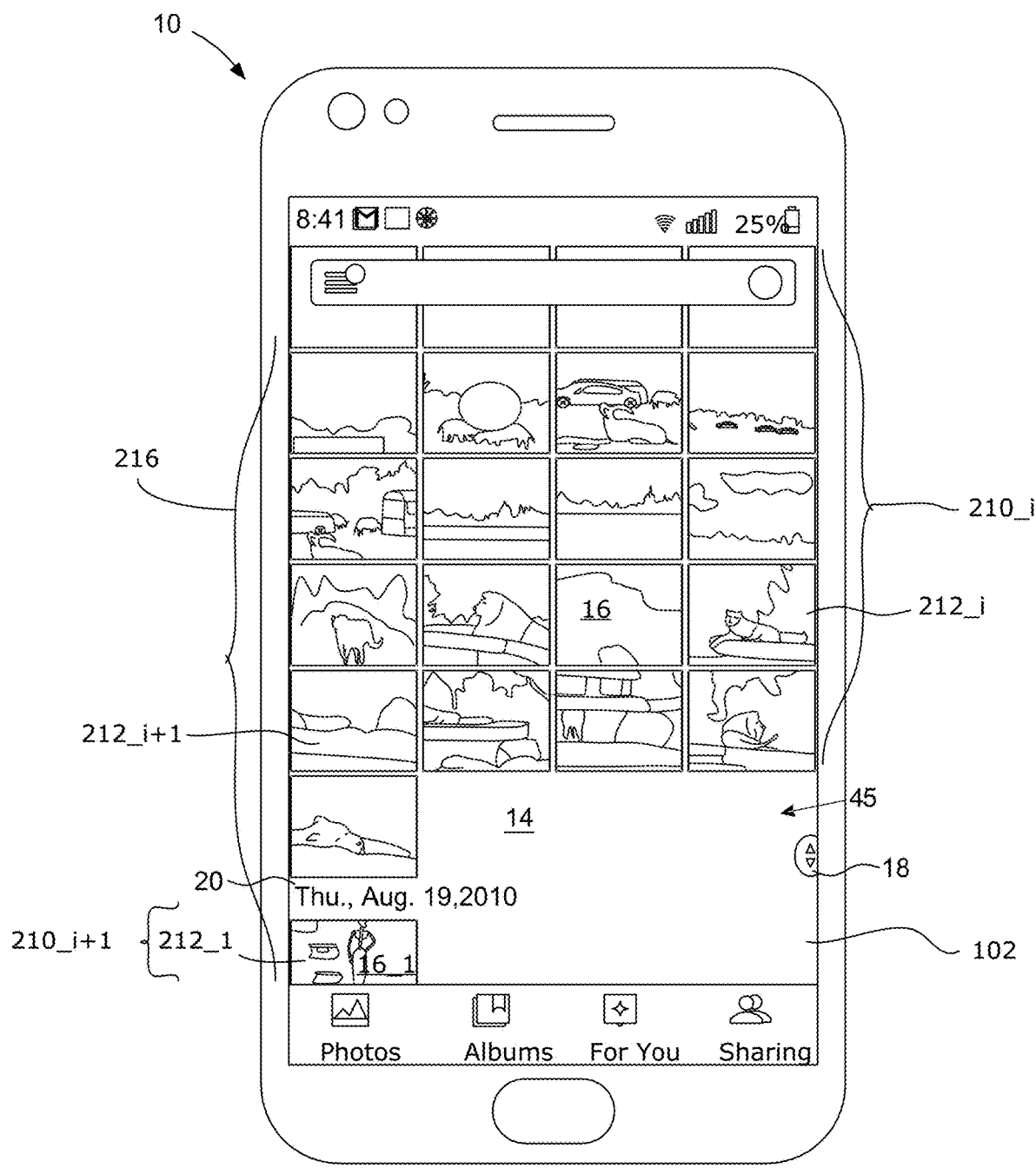
FIG. 2 depicts the electronic device of FIG. 1B wherein the viewing area shows the user interface of a picture viewing application that includes a list of images and a scrubber.
Figure 3:
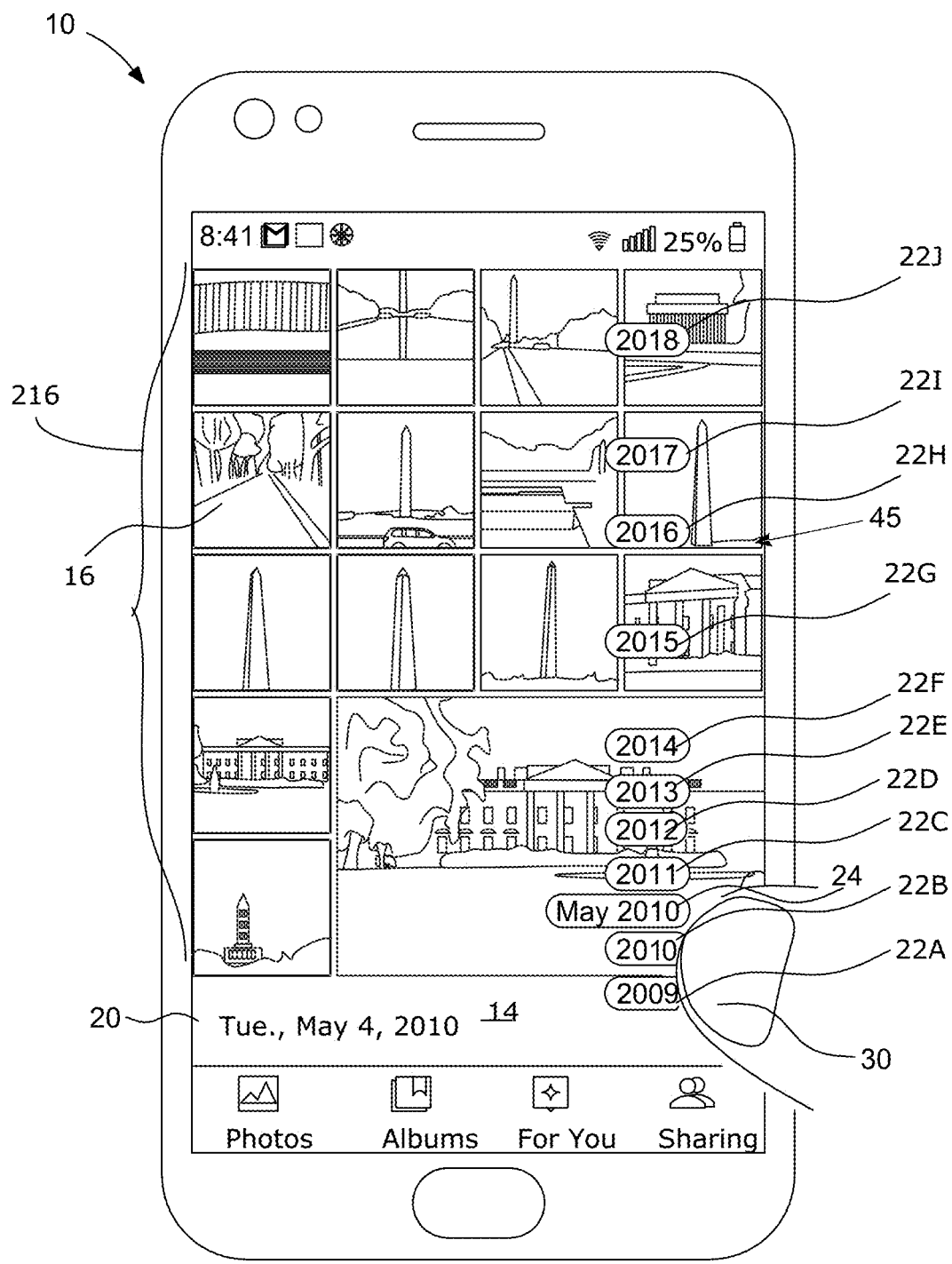
FIG. 3 depicts the electronic device of FIG. 2 wherein the scrubber has been dragged in a downward scrolling gesture to scroll down the list of images.
Figure 4:
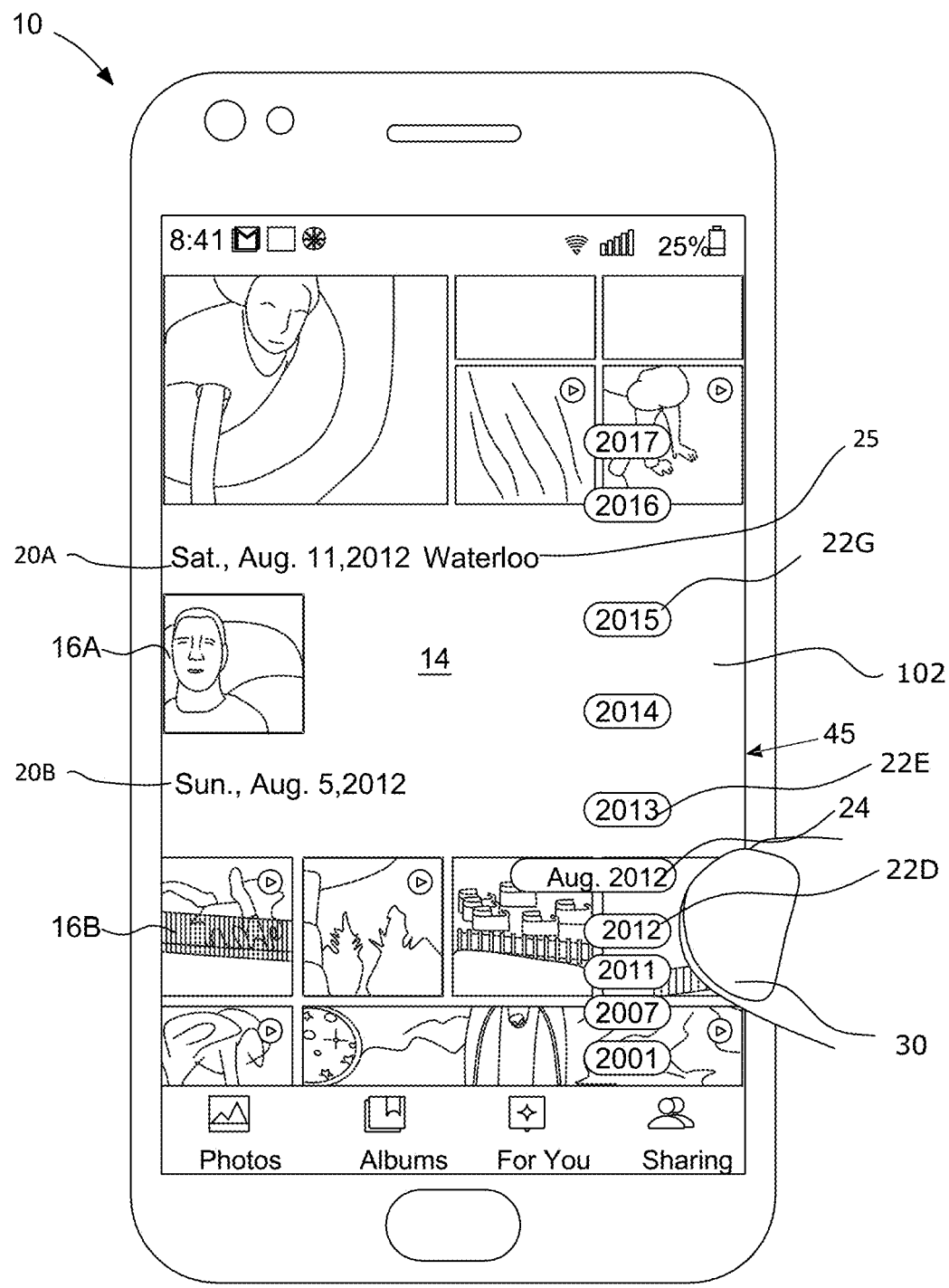
FIG. 4 depicts the electronic device of FIG. 3 wherein the scrubber has been dragged in an upward scrolling gesture to scroll up the list of images.

In some example embodiments, the scrubber 18 is not visible by default and is displayed in response to user interaction with the screen of the touchscreen display 45. In one example, the scrubber 18 is displayed in response to a scrolling gesture by a hand or a touch input tool. In another example, the scrubber 18 is displayed in response to touch flicking the screen of the touchscreen display 45, by a finger 30 or a touch input tool. In other embodiments, the scrubber 18 is always displayed to indicate the relative position of the currently displayed content in relation to the entire content or list of elements being scrolled through, as discussed above. If the contents of the viewing area 102 are scrolled using traditional touch flicks, the position of the scrubber 18 is updated to indicate the new relative position of the current screen contents in relation to the entire content. In some example embodiments, the scrubber 18 has a timeout associated therewith. Accordingly, when the finger 30 or touch input tool is released from the scrubber 18, the scrubber 18 is displayed for a few seconds then removed so it does not obscure any content of the user interface 14 of the application located under it As an example of the use of the scrubber 18 to scroll through a list of elements, FIGS. 2-4 depict an electronic device 10 having a touchscreen display 45 the viewing area 102 of which displays the user interface 14 of a photo viewing application such as Google Photos rm. The photo viewing application contains or has access to a list 200 of elements 210 which cannot entirely fit on the viewing area 102 of the touchscreen display 45. The user interface 14 includes a visible list portion 216 of a list 200 of elements 210. The visible list portion 216 includes a plurality of elements 210 each including one or more sub-elements 212. The elements 210 each represents a group of photos or videos captured on a given date. The sub-elements 212 are in the form of images 16. Each image 16 represents either a digital photo or a video. An image 16 can be actuated to cause the photo viewing application to render the corresponding photo or playback the corresponding video on at least part of the user interface 14.

The visible list portion 216 in FIG. 2 includes an element 210_$i$ and an element 210_$i$+1. The element 210_$i$ includes a plurality of sub-elements 212 including sub-elements 212_$i$ and 212_$i$+1. The sub-elements 212 of element 210_$i$ are in the form of images 16 representing photos and video taken on a first date. The element 210_$i$+1 includes sub-element 212_1 in the form of image 16 representing a photo or a video taken on a second date, which in this case is Thursday Aug. 19, 2010 as represented by the date indicator 20.

The photo viewing application can be configured to sort the list 200 such that the most recent elements 210 (and their sub-elements 212) are at the top of the list 200, or such that the most recent elements 210 (and their sub-elements 212) are at the bottom of the list 200. In the depicted example, the photo viewing application has been configured so that the most recent elements 210 are at the top of the list 200. Each group of images 16 captured on a particular date are rendered below a date indicator 20. For example, the image 161 corresponding to sub-element 212_1 is displayed below the date indicator 20 indicating that the corresponding photo or video was taken on Thursday Aug. 19, 2010. Since the list 200 is sorted such that the most recent elements 210 are at the top, then the images 16 corresponding to the sub-elements 212 of the element 210_$i$, which are rendered above the date indicator 20, were captured after the date indicated by the date indicator 20, i.e. after Thursday Aug. 19, 2010.

In some example embodiments, the contents of the viewing area 102 can be scrolled up or down by touch flick action as described above. Scrolling through a list of elements by touch flicks entails going through the list 200 element by element. For a list 200, which is long, getting to a particular element 210 which is far up or down the list 200 or in the middle requires many touch flicks. As such, locating a particular element using the touch flick scrolling method is both arduous and time consuming. For example, the constant touch flicking on the screen requires processing every touch flick by a touch sensing system 112, a touchscreen driver 114 and a UI module 116 as will be described below. This processing consumes power and processing cycles thus potentially draining the battery. The touch sensing hardware may degrade from the constant flicking. Furthermore, some users may experience carpal tunnel syndrome (CTS) from repeatedly flicking their finger against the screen of the touchscreen display 45. Locating an element 210 of a list 200 in such a time consuming manner also requires the touchscreen display 45 to remain on for a longer duration which consumes battery power.

One approach to address the limitations of scrolling by touch flicks is through the use of a scrubber 18, which was described with reference to FIG. 1B. With reference to FIG. 2, a scrubber 18 is displayed on the right side of the user interface 14 of the photo viewing application adjacent the right edge 45A of the touchscreen display 45. The scrubber 18 provides improved functionality over the simple touch flick method described above. The scrubber 18 may be touched then either dragged down in a downward scrolling gesture or dragged up in an upward scrolling gesture. In response to dragging the scrubber 18, a plurality of year field indicators 22 each representing a year are displayed, as shown in FIG. 3. In FIG. 3, the scrubber 18 is not visible as it is hidden under the user's finger 30. In response to dragging the scrubber 18, a month field indicator 24 and a plurality of year field indicators 22A-22J (collectively "22") are displayed. The month indicator 24 is displayed in alignment with the scrubber 18. In the depicted embodiment, the visible list portion 216 includes images 16 which were captured in May 2010. Accordingly, the month field indicator 24 reads "May 2010". The year field indicators 22A-22J indicate different years in which images 16 where captured before and after the images 16 of the visible list portion 216. The order of the years in the year field indicators 22 indicates that the list of images 16 is sorted such that the most recent images 16 are at the top of the list 200, i.e. they are in a descending chronological order. The month field indicator 24 is located between the year field indicator 22B representing the year 2010, and the year field indicator 22C representing the year 2011.

The scrubber 18 may be dragged upwards, in an upward scrolling gesture, towards the year field indicator 2011 to increment the month displayed by the month field indicator to June 2010. Continuing to drag the scrubber 18 upwardly causes the month field indicator 24 to keep incrementing. When the scrubber 18 is in alignment with the year field indicator 22C corresponding to 2011, the month field indicator 24 changes to "January 2011". FIG. 4 depicts the user interface 14 after, starting from the position in FIG. 3, the scrubber 18 was dragged in an upward scrolling gesture until the month indicator read "August 2012". Within the month of August 2012, a first date indicator 20A reads "Sat., Aug. 11, 2012". Accordingly, the image 16A which is rendered under the first date indicator 20A was captured on that date. Similarly, a second date indicator 20B reads: "Sun. Aug. 5, 2012", and the photos and videos 16B rendered under the second date indicator 20B were taken on that date. The user interface 14 of the photo viewing application also shows a location indicator 25 next to the date indicator 20A. This indicates the location of the photo 16A taken on the date indicated by the date indicator 20A.

In the depicted embodiment of FIGS. 2-4, as the scrubber 18 is dragged in either an upward or a downward scrolling gesture, the visible list portion 216 is updated in real-time. The contents of the visible list portion 216 are updated to reflect the current position of the scrubber 18 in relation to the year field indicators 22. For example, as shown in FIG. 4, the scrubber 18 is positioned between the year field indicator 22D corresponding to 2012 and year field indicator 22E corresponding to 2013. The month field indicator 24 reads "August 2012", and the images 16 on the touchscreen display 45 are from days in August 2012.

In view of FIGS. 2-4, it can be seen that scrolling based on a single attribute, the date, is possible with the known scrubber 18 interface. However, images 16 can have other attributes such as location and photo content. Furthermore, the scrolling method shown in FIGS. 2-4 is sequential in nature. For example, if it is desired to scroll from May 2011 to June 2015, one has to scroll through every single month between May 2011 and June 2015. If certain months have a high number of images 16, then the scrolling will take longer.

In a list 200, each element 210 may have a plurality of attributes. For example, in a list of images representing photos or videos each image may have a date attribute, a location attribute and a content attribute. Attributes may be classified into a number of categories. A nominal attribute is used to name or label an element without any quantitative value. There is no intrinsic ordering to nominal data. Examples of ordinal attributes include age, gender, shape and color. Ordinal attributes categorize data with an order. Examples of ordinal attribute include time, distance and weight. An ordinal attribute may be comprised of a plurality of fields. For example, a time attribute may be comprised of a year, a month and a day; or an hour, a minute and a second. A distance attribute may be comprised of kilometers, meters and centimeters.

Figure 5A:
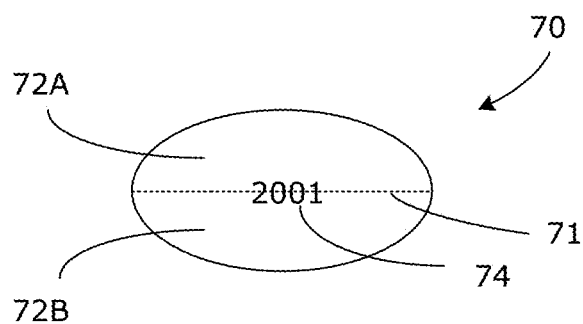
FIG. 5A depicts an ordinal attribute field control, in accordance with an example embodiment.

To manipulate or scroll through a list 200 of elements 210 taking into account either the elements' 210 ordinal or nominal attributes, some user interface elements are introduced. With reference to FIG. 5A, an example ordinal attribute field control 70 is shown. In the depicted example, the ordinal attribute field control 70 corresponds to a year field of a time attribute. The ordinal attribute field control 70 is comprised of a top half portion 72A, a bottom half portion 72B and an attribute field value caption 74. A virtual line 71 separates the top half portion 72A and the bottom half portion 72B. The attribute field value caption 74 displays the current attribute field value of an element associated with the ordinal attribute field control 70. The current attribute field value can be incremented by touching the top half portion 72A, and decremented by touching the bottom half portion 72B. The attribute field value caption 74 is updated to reflect the current attribute field value in real-time. For example, if the bottom half portion 72B is touched by a finger or a touch input tool, then the attribute field value "2001" which represents a year is decremented to "2000". If the touch persists on the bottom half portion 72B the year is decremented again from "2000" to "1999". Conversely, the attribute field value is incremented when the top half portion 72A is touched. If both the top half portion 72A and the bottom half portion 72B are touched then the attribute value remains the same. An ordinal attribute having a plurality of fields can be manipulated using a plurality of nominal attribute field controls 70 as will be described below. In some embodiments, the distance between the point of touch of top half portion 72A or the bottom half portion 72B and the virtual line 71 determines the speed by which the attribute field value increments or decrements. For example, touching the top half portion 72A in proximity to the virtual line 71 may increment the year by 1 year every second, but touching the top half portion 72A at a farther distance from the virtual line 71 may increment the year by one every half a second. In another embodiment, the ordinal attribute field control 70 of FIG. 5A increments and decrements the corresponding attribute field value in response to swipes. For example, to increment the attribute field value a finger 30 or a touch input tool is swiped upwardly such that it first touches the bottom half portion 72B, then touches the top half portion 72A. Conversely, to decrement the attribute value a finger 30 or a touch input tool is swiped downwardly such that it first touches the top half portion 72A and then touches the bottom half portion 72B.

Figure 5B:
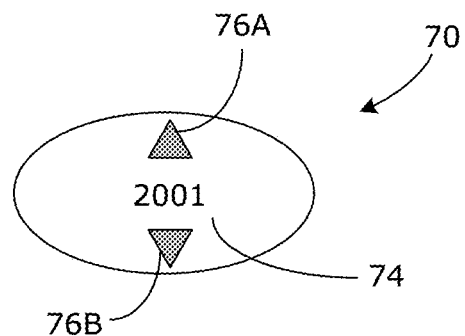
FIG. 5B depicts an ordinal attribute field control, in accordance with another example embodiment.

FIG. 5B depicts an alternate embodiment of the ordinal attribute field control 70 which features an increment arrow 76A for incrementing the attribute field value corresponding to the attribute field control 70 and a decrement arrow 76B for decrementing the attribute field value.

Figure 5C:
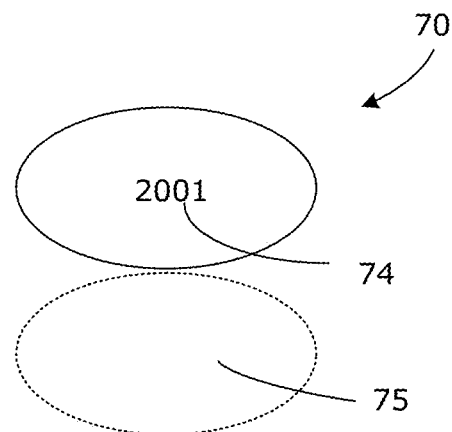
FIG. 5C depicts an ordinal attribute field control, in accordance with yet another example embodiment.

FIG. 5C depicts another embodiment for an ordinal attribute field control 70. In this embodiment, the attribute field control 70 responds to actions on an active area located below it. For example, the active area 75 is located under the attribute field control 70 of FIG. 5C. To increment the attribute field value associated with the attribute field control 70, the user touches the active area 75 and swipes upwardly towards the attribute field control 70. In response the attribute field control 70 moves upwardly and the attribute value is incremented, in this case to the year "2002". The attribute field value caption 74 is updated to read "2002". Further swiping in the upward direction causes further incrementing of the attribute value to "2003" and the attribute field control 70 is also moved upwardly remaining just above the active area 75. Conversely, when a finger or a touch input tool first touch the active area 75 and is swiped downwardly, the attribute field control 70 is also moved downwardly maintaining its position just above the active area 75 and the attribute field value is decremented, in this case to the year "2000". The advantage of this control is that the attribute field value caption 74 is visible during incrementing and decrementing the attribute value. In some embodiments, an upward swipe may decrement the attribute field value and the downward swipe may increment the attribute field value.

In yet another example embodiment (not shown), the attribute field control has a top active area above it and a bottom active area below it. Touching the top active area increments the attribute value while touching the bottom active area decrements the attribute value.

Figure 5D:
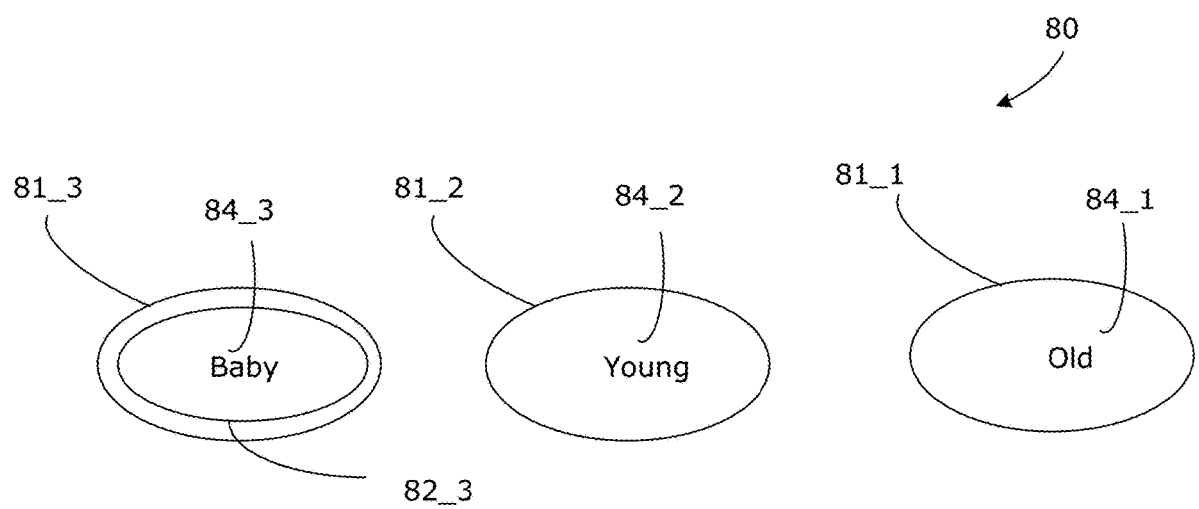
FIG. 5D depicts a nominal attribute radio button control group comprised of three nominal attribute radio button controls, in accordance with an example embodiment.

A nominal attribute typically takes one of a plurality of attribute values which are not quantitative. For example, a person may be one of: old, young and a baby. Accordingly, to select a nominal attribute value, a control which permits the selection of one value is appropriate. FIG. 5D depicts an example nominal attribute radio button control group 80. The radio button control group 80 is comprised of three nominal radio button attribute field controls 81_1, 812 and 81_3 (collectively "81"). The radio button attribute field control 811 displays a caption 84_1 containing a value of "Old", the radio control attribute field button 81_2 displays a caption 84_2 containing a value of "Young", and the radio button attribute field control 81_3 displays a caption 84_3 containing a value of "Baby". In one embodiment, touching a radio button attribute field control 81 associated with an attribute, assigns the corresponding attribute field value indicated by the caption 84 of that radio control button attribute field control 81 to the corresponding attribute. For example, in FIG. 5D the radio button attribute field control 81_3 was touched and became activated. Therefore the nominal attribute corresponding to the radio button control group 80 is assigned the value "Baby" which is indicated by the caption 84_3. The radio button control 81_3 now also displays an activation indicator 82_3 indicating that it is the active radio button attribute field control 81 in the radio button control group 80. In another embodiment, the attribute value is assigned the value associated with a radio button attribute field control when a finger or touch input tools is released from the radio button attribute field control 81. For example, if the radio button control group 80 is rendered on the viewing area 102 of a touchscreen display 45, the user may swipe a finger 30 until it is on the radio button attribute field control 81_3. Then upon lifting the finger 30, the attribute value is assigned the value associated with the radio button attribute field control 81_3 (i.e. "Baby").

While the attribute field controls 70 and 80 are depicted as being oval in shape, it would be understood by those of skill in the art that other shapes are contemplated and would perform the same functions. Furthermore, other controls which permit incrementing and decrementing a value are contemplated as ordinal attribute field controls. Additionally, other controls which permit selecting a value from among a number of other preset values are contemplated as nominal attribute field controls.

Figure 6:
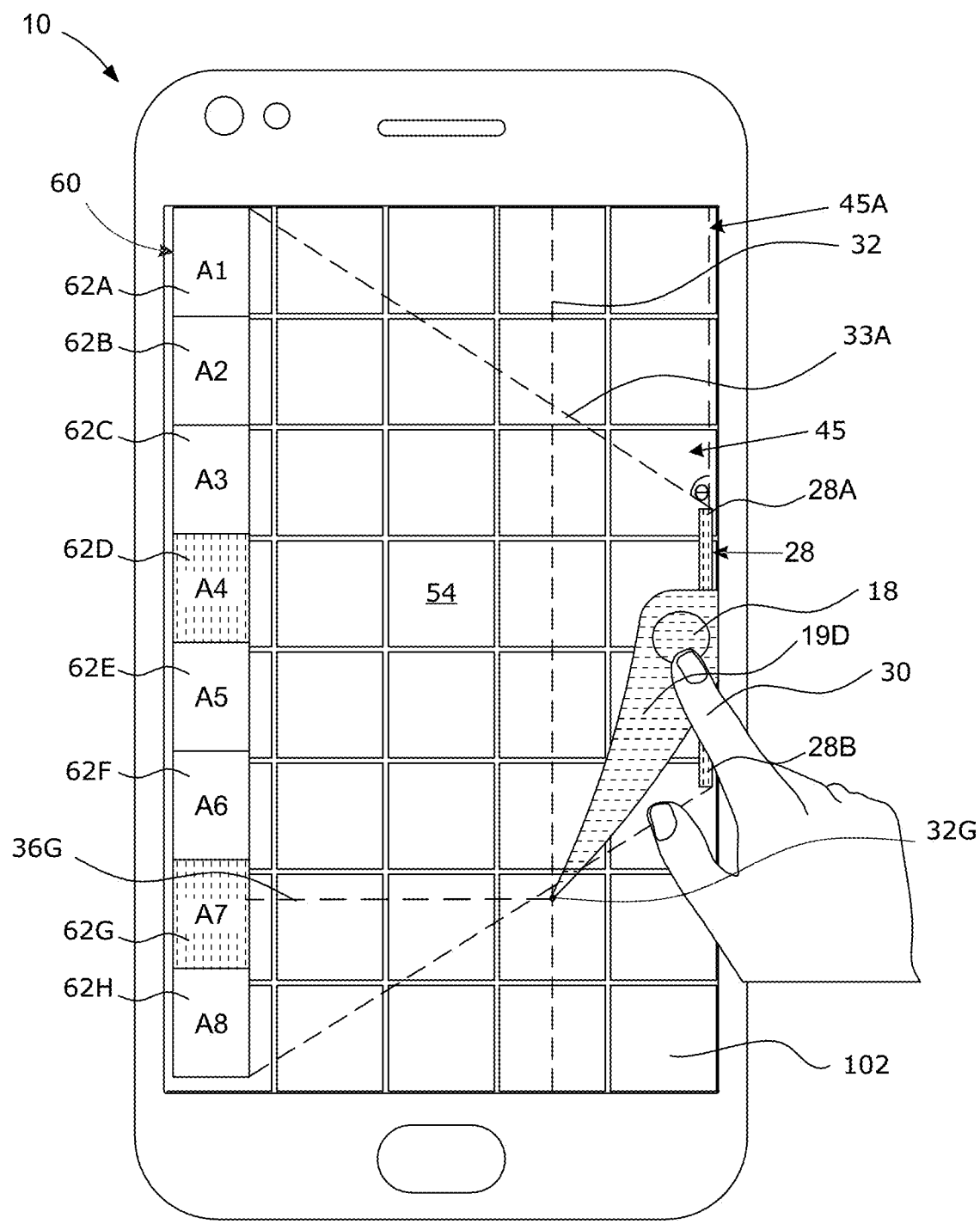
FIG. 6 depicts an electronic device having a touchscreen display including a viewing area showing an attribute selection view for selecting attributes for scrolling through or filtering a list of elements, in accordance with some example embodiments.

An example embodiment of a user interface which facilitates scrolling a list of elements based on a plurality of attributes of is shown in FIG. 6. An electronic device 10 having a touchscreen display 45 is depicted. The touchscreen display 45 has a viewing area 102 on which a user interface 54 is rendered. The user interface 54 features a scrubber 18, an around scrubber area (ASA) 28, and an attribute selection view 60. The ASA 28, which is the area around the scrubber 18, is displayed on the right side of the touchscreen display 45. The ASA 28 is shown as an elongate rectangular shape which has a top end 28A and a bottom end 28B. In the depicted embodiment, the attribute selection view 60 is displayed on the left side of the viewing area 102 of the touchscreen display 45. The attribute selection view 60 is comprised of a plurality of attribute selection elements 62A-62H (collectively "62"). Each attribute selection element 62 represents an attribute of an element 210 of a list 200. In the depicted embodiment, the attribute selection elements 62A-62H represent attributes A1-A8, respectively. Each one of the attributes A1-A8 may be an ordinal attribute or a nominal attribute. The attribute selection elements 62 can each be used to select a corresponding attribute (A1-A8). A selected attribute is used to affect the scrolling or filtering of the list of elements 200 as will be described below. A selection distance threshold (SDT) 32 is shown as a virtual vertical line parallel to the right edge 45A of the touchscreen display 45. The SDT 32 defines a threshold for activating an attribute (A1-A8) corresponding to an attribute selection element 62. For example, in FIG. 6 it is desired to activate the attribute A7. Initially the user touches the screen at the ASA 28 with the finger 30. At this point the user may scroll the viewing area 102 using upward or downward scrolling gestures using the scrubber 18, as described earlier. However, in this case, it is desired to select and activate the attribute A7 to be used in the scrolling. The user swipes the finger 30 towards the activation point 32G, in an attribute activation swipe. The activation point 32G is a point on the SDT 32 which is in horizontal alignment with the attribute selection element 62G corresponding to attribute A7. A swipe indicator 19D is displayed as the finger 30 is swiped diagonally, in the attribute activation swipe, towards the SDT 32. The swipe indicator 19D is an optional shape that assists the user in determining which attribute (A1-A8) will be activated if finger 30 continues to be swiped in the same direction until it reaches a point on the SDT 32. The finger 30 reaches the activation point 32G on the SDT 32. The activation point 32G is aligned horizontally with the attribute selection element 62G, as represented by a horizontal line 36G. Accordingly, the attribute A7 corresponding to the attribute selection element 62G is activated. When the attribute A7 is activated, the corresponding attribute selection element 62G is highlighted as shown. FIG. 6 also shows the attribute selection element 62D as highlighted indicating that the corresponding attribute A4 was previously activated. Accordingly, multiple attributes, such as A1-A8 can be activated by using different attribute activation swipes on the screen from the ASA 28 towards a point on the SDT 32 in alignment with the desired attribute selection element 62. Once attributes are activated, the corresponding attribute field controls (70, 80) are displayed to assist in scrolling or filtering based on the active attributes, as will be described below.

In order to distinguish between an attribute activation swipe, such as 19D, and the upward or downward scrolling gestures, the attribute activation swipe is preferably at a significant angle θ with respect to the vertical so it is distinguishable from a swipe which is parallel to the scrolling direction. For example, when activating the attribute A8, it is preferable to initially swipe the finger 30 in a downward scrolling gesture towards the bottom end 28B of the ASA 28, then swipe it diagonally towards the activation point 32G on the SDT 32. Similarly, if the attribute "A1" is to be activated, the finger 30 is preferably swiped to the top end 28A of the ASA 28 then swiped diagonally to a point on the SDT 32 which aligns horizontally with the attribute activation element 62A corresponding to the attribute "A1". The angle θ is preferably 30 degrees or higher.

Figure 7:
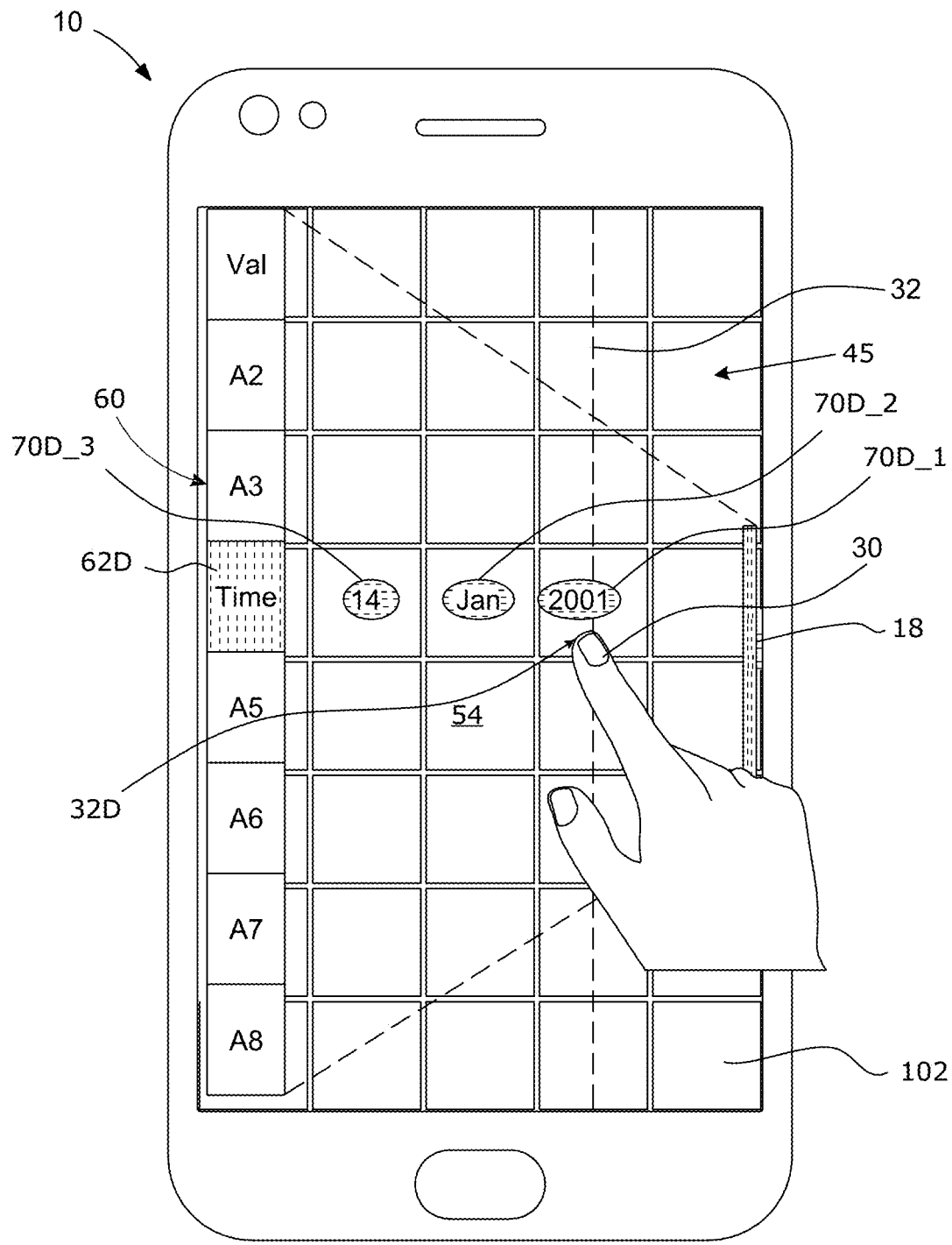
FIG. 7 depicts the electronic device of FIG. 6, wherein the viewing area shows a plurality of ordinal attribute field controls corresponding to an activated ordinal attribute.

Once an attribute has been activated, as described above with reference to FIG. 6, the corresponding attribute value can be changed to affect the scrolling or filtering of a list 200 of elements 210. FIG. 7 depicts an example embodiment where the "Time" attribute has been activated by the method described in FIG. 6, above. As such the finger 30 is shown touching the screen at the point of activation 32D which is in alignment with the attribute selection element 62D corresponding to the "Time" attribute. The "Time" attribute is an ordinal attribute comprised of three fields: a year, a month and a day. In response to the activation of the "Time" attribute, ordinal attribute field controls 70D_1, 70D_2 and 70D_3 (collectively "70D") corresponding to the "Time" attribute are displayed above the point of activation 32D. The attribute field control 70D_1 represents the year, the attribute field control 70D_2 represents the month, and the attribute field control 70D_3 represents the day.

At this point, with the attribute field controls 70D displayed, scrolling through a list of elements each having a time attribute can be done by manipulating one or more attribute field controls 70D, as described above with reference to FIGS. 5A-5C. For example, if the attribute field controls 70 shown in FIG. 7 are similar to the attribute field controls of FIG. 5A, the finger 30 may be swiped upwardly in relation to the attribute field control 70D_1 thus incrementing the year, until it reads "2005" for example. By incrementing an attribute field control such as 70D_1, the attribute field value (in this case the "year") associated with the attribute field control 70D_1 is incremented. As a result, the attribute value for the "Time" attribute is also updated, in this case to 14 January, 2005. In response to updating the attribute value for "Time", the contents of the viewing area 102 are scrolled so that the elements displayed are centered around 14, January, 2005. Without lifting the finger 30 off the screen, the finger 30 may be swiped to the left to manipulate the month attribute field. For example, the month attribute field control 70D_2 may be manipulated to increment the month to "July". This results in the attribute value for "Time" being changed to 14, July, 2005. In response, the contents of the viewing area 102 are scrolled so that the elements displayed are centered around 14, July, 2005.

Similarly, the finger 30 may be swiped further to the left to manipulate the date attribute field control 70D_3. Manipulating the attribute field controls 70D updates the visible list portion 216 of a list of elements in this case by scrolling up and down a list 200. Specifically, the attribute field controls 70D allow scrolling of a list 200 of elements 210 by different fields of an ordinal attribute since changing the attribute field values associated with the attribute field controls 70D results in changing the attribute value, which is comprised of the individual attribute field values. As discussed, the "Time" attribute value is comprised of the year attribute field control value, the month attribute field control value and the date attribute field control value. In this case, the different attribute fields represent different levels of granularity. For example, manipulating the year attribute field control 70D_1 causes fast scrolling of the list 200 by the coarse granularity of a year. Manipulating the month attribute field control 70D_2 causes scrolling with the finer granularity of a month. Accordingly, using the earlier example discussed above where it was desired to scroll from May 2011 to June 2015, the year attribute field control 70D_1 can be manipulated to increment the year from 2011 to 2015, then the month attribute field control 70D_2 can manipulated to increment the month from May to June. Advantageously, the content displayed on the viewing area 102 of the touchscreen display 45 is scrolled efficiently to display the desired visible list portion 216 with a minimal number of swipe gestures.

In the aforementioned embodiment, shown in FIGS. 6-7, the scrubber 18 is hidden once an attribute is activated and the corresponding attribute field controls 70 are displayed. Once the attribute field controls 70 are adjusted and the finger is lifted off the screen, the attribute field controls 70 are removed from the screen and the scrubber 18 is re-displayed. At this point the screen contents can be scrolled either using touch flicks or using the scrubber 18. In some embodiments, if the scrubber 18 is not used for scrolling then after a brief period of time it is removed. In other embodiments, the scrubber 18 is displayed even during the manipulation of the attribute field controls 70. Whenever the contents of the viewing area 102 are scrolled, the position of the scrubber 18 is adjusted to indicate the position of the visible list portion 216 relative to the full list 200, as discussed earlier.

Figure 8:
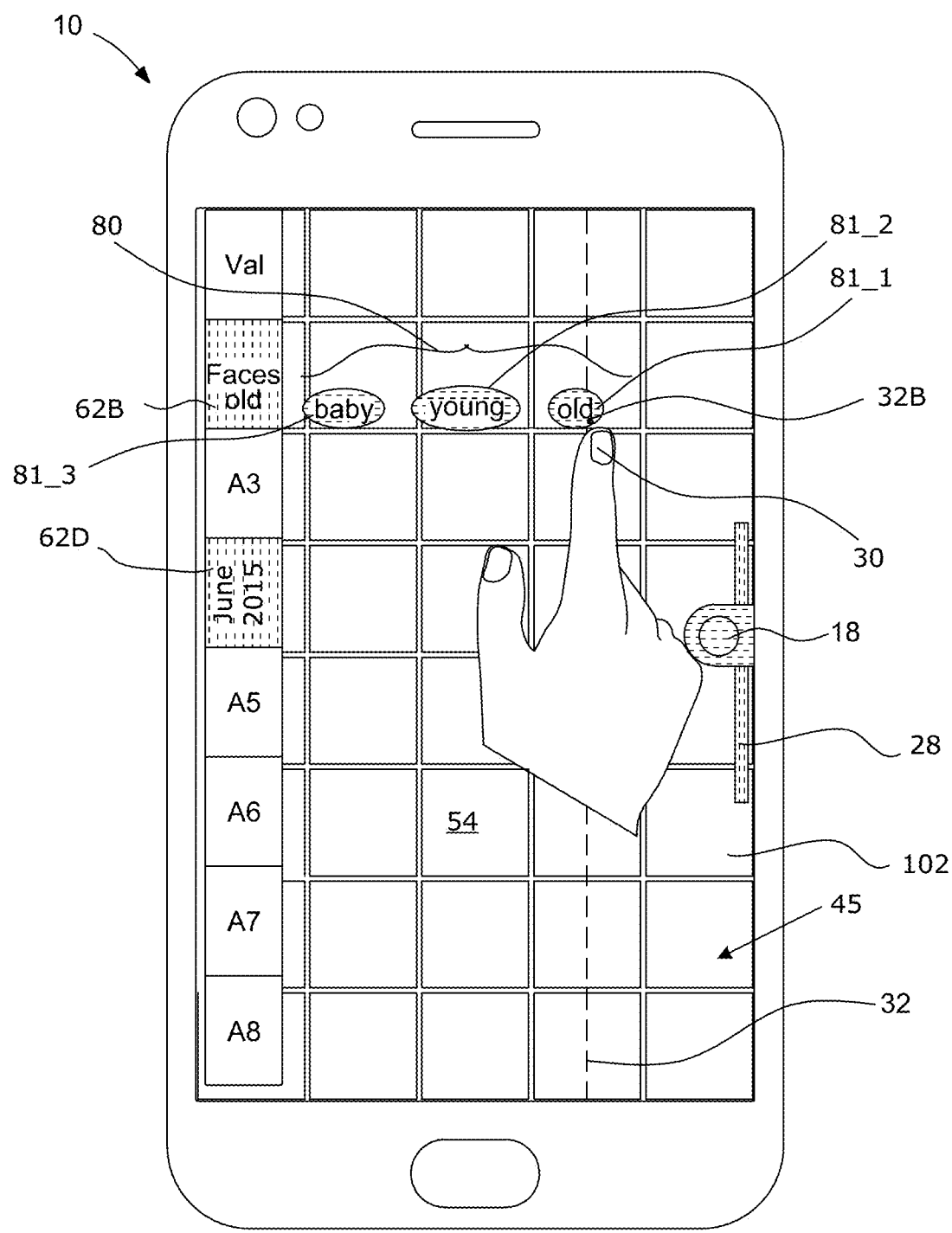
FIG. 8 depicts the electronic device of FIG. 6, wherein the viewing area shows a nominal attribute radio button control group corresponding to an activated nominal attribute.
Figure 9:
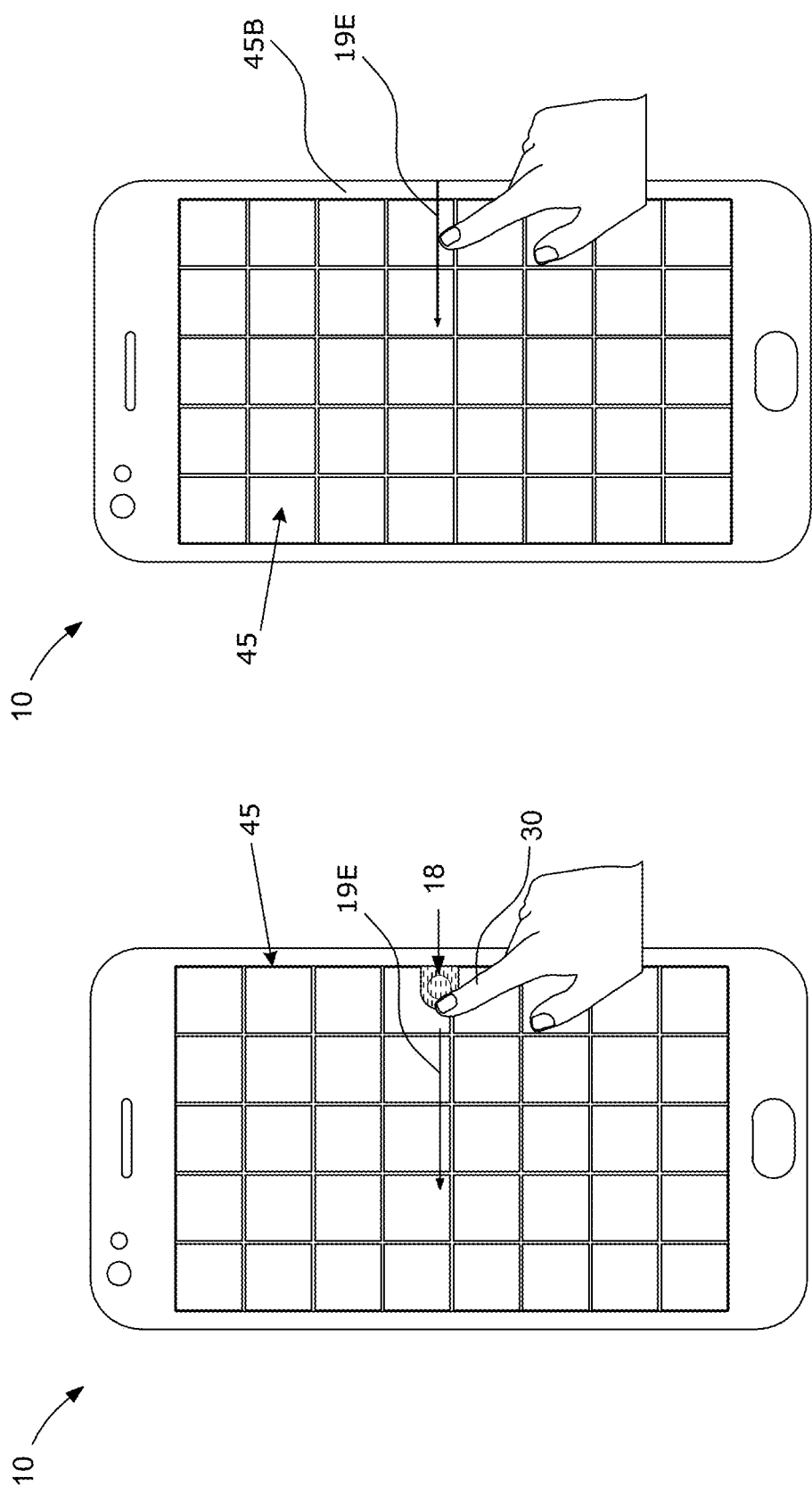
FIG. 9A depicts the electronic device of FIG. 6 wherein swiping a scrubber is used to trigger the display of an attribute selection view.
FIG. 9B depicts the electronic device of FIG. 6 wherein a bezel swipe is used to trigger the display of an attribute selection view.

If it is desired to scroll through or filter the list 200 using a second attribute, in addition to the activated first attribute, then a second attribute is activated in the same manner described above using an activation swipe towards the SDT 32. In response to the activation of the second attribute, the attribute field controls corresponding to the second attribute are displayed and can be used to scroll or filter the list in conjunction with the first attribute. With reference to FIG. 8, an example embodiment is shown where a first "Time" attribute has already been activated and particular month and year have been selected as described above. The attribute selection element 62D corresponding to the "Time" attribute shows the currently selected month and year (as "June 2015"). A second "Faces" attribute is activated by swiping a finger 30 from the ASA 28 to a point 32B on the SDT 32 aligned with the attribute selection element 62B corresponding to the "Faces" attribute. The "Faces" attribute is a nominal attribute taking one of three values: "old", "young" and "baby". Accordingly, in response to activating the "Faces" attribute, a nominal attribute radio button control group 80, described above with reference to FIG. 5D, is displayed. The radio button control group 80 is comprised of three nominal attribute radio button controls 81_1, 812 and 81_3 corresponding to the nominal attribute values "old", "young" and "baby", respectively. The finger 30 can be swiped onto any one of the radio button attribute field controls 81_1 to select the corresponding attribute value. To complete the selection, the finger 30 is lifted off the screen. The attribute selection element 62B is highlighted and is updated to display an indication to reflect the attribute value selected. For example, if "old" is selected, then the attribute selection element 62B shows "Faces old" as shown in FIG. 8. Since the "Faces" attribute is a nominal attribute, it is used to filter the displayed elements of the list 200. Accordingly, when the "Faces" attribute is set to the value "old" then only photos of adults over 65 years old are displayed as part of the visible list portion 216. As shown in FIG. 8, the "Time" attribute represented by the attribute selection element 62D is also highlighted. Therefore, both the "Faces" and "Time" attribute are used to determine a visible list portion 216 of a list of elements, such as photos, to be displayed on the touchscreen display 45. In this example, the nominal "Faces" attribute filters the list, while the "Time" attribute permits scrolling by year, month or day. The user can re-activate the Time attribute by swiping from the ASA 28 towards the point 32D as before. Once the Time attribute has been reactivated, the attribute field controls 70D can be used to scroll up and down the visible list portion 216 which is now also filtered to only show photos of adults over 65 years old. In some embodiments, to clear a selected attribute, the user can tap the corresponding attribute selection element. For example, to clear the "Faces" attribute, the user can tap the attribute selection element 62B. In other embodiments, a dedicated "Reset" control is displayed in the attribute selection view 60, similar to the attribute activation element 35A of FIG. 10 discussed below.

Another example embodiment for activating attributes is depicted in FIGS. 9-15. In one example embodiment, an attribute activation view 34 is originally hidden and is displayed in response to an attribute activation view 34 activation action, such as an attribute activation view 34 activation swipe. With reference to FIG. 9A, an attribute activation view 34 is displayed in response to an activation swipe in which the scrubber 18 is swiped to the left in the direction 19E, away from the attribute activation view and towards the central region of the viewing area 102. Alternatively, as depicted in FIG. 9B, an attribute activation view 34 is displayed in response to by swiping on the bezel 45B to the left in the direction 19E.

Figure 10:
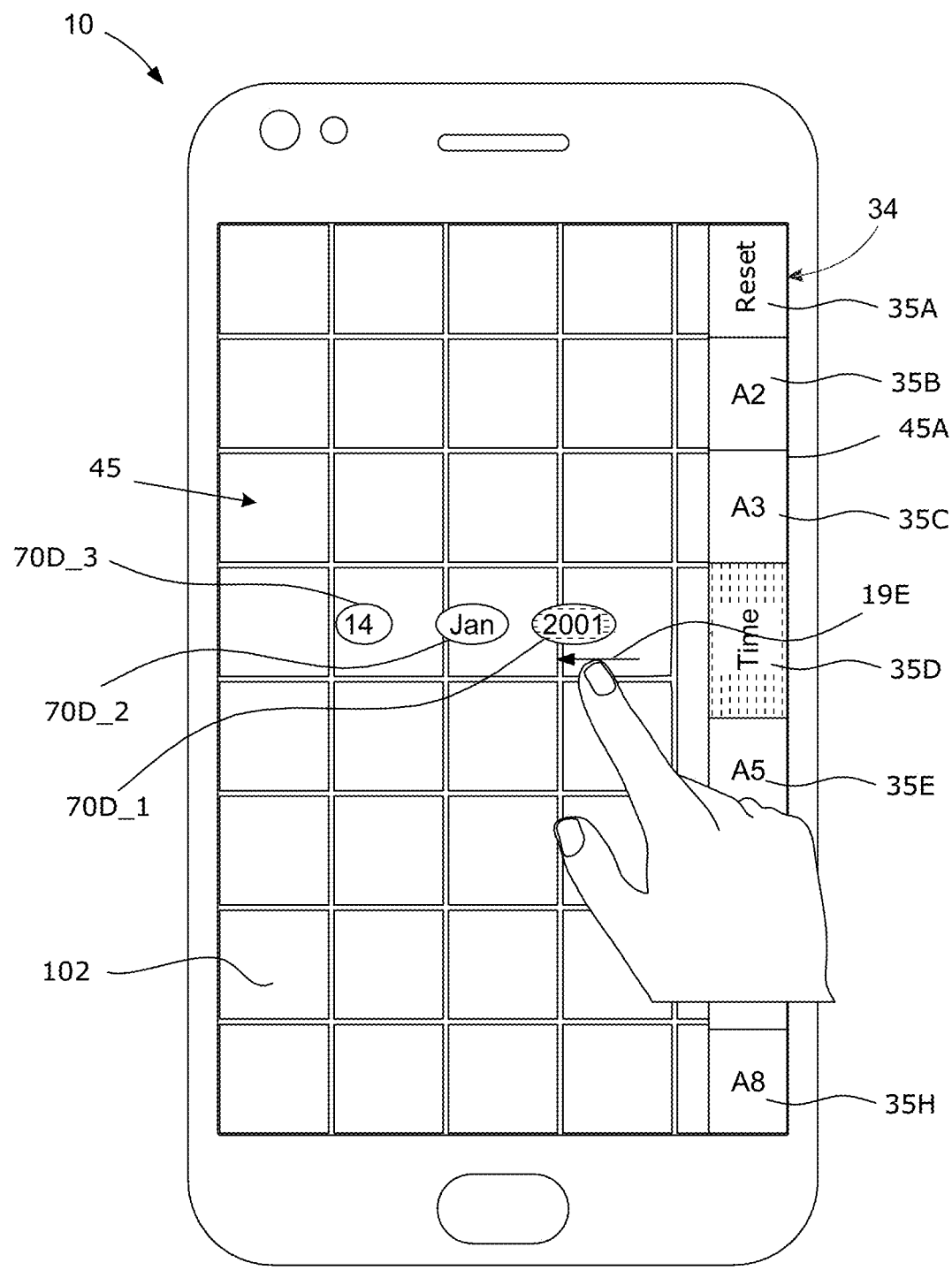
FIG. 10 depicts an electronic device having a touchscreen display including a viewing area showing an attribute activation view for selecting and activating attributes for scrolling through or filtering a list of elements, and a plurality of ordinal attribute field controls corresponding to an activated ordinal attribute representing time, in accordance with some example embodiments.

FIG. 10 shows the attribute activation view 34 rendered as a longitudinal rectangular user interface element along the right edge 45A of the touchscreen display 45. The attribute activation view 34 is comprised of a plurality of attribute activation elements 35A-35H (collectively "35"). In this example embodiment, the first attribute activation element 34A serves as a reset user interface element which clears all active attributes associated with the attribute activation elements 35. An attribute is activated by touching the corresponding attribute activation element 35 with a finger 30 or touch input tool, and then swiping to the left towards the middle of the screen. For example, in FIG. 10, the "Time" attribute has been selected by touching the corresponding attribute activation element 35D and swiping to the left in the direction 19E. In response to the activation of the "Time" attribute, the ordinal attribute field controls 70D_1, 70D_2 and 70D_3 are displayed as discussed before. The finger 30 can then be further swiped in the direction 19E until it is aligned with the attribute field control 70D_1 corresponding to the year field. The year can be incremented or decremented by swiping up or down under the year attribute field control 70D_1 as described earlier with reference to FIG. 5C. In response to changing the year, the content of the viewing area 102 of the touchscreen display 45 is updated accordingly. As discussed above, the "Time" attribute is an ordinal attribute, and therefore the attribute field controls 70D can each be used to scroll up and down a visible list portion 216, such as a list of photos as discussed above. For example, to scroll by a granularity of one year at a time, the finger or touch input tool is swiped up or down below the attribute field control 70D_1, as discussed above with reference to FIG. 5C. To scroll through the list 200 by a granularity of a day, the finger 30 is further swiped in the direction 19E until it is just under the attribute field control 70D_3 corresponding to the day. The attribute field control 70D_3 can then be used to increment or decrement the day field of the "Time" attribute. Accordingly, the contents of the viewing area 102 of the touchscreen display 45 are scrolled by the granularity of a day.

Figure 11:
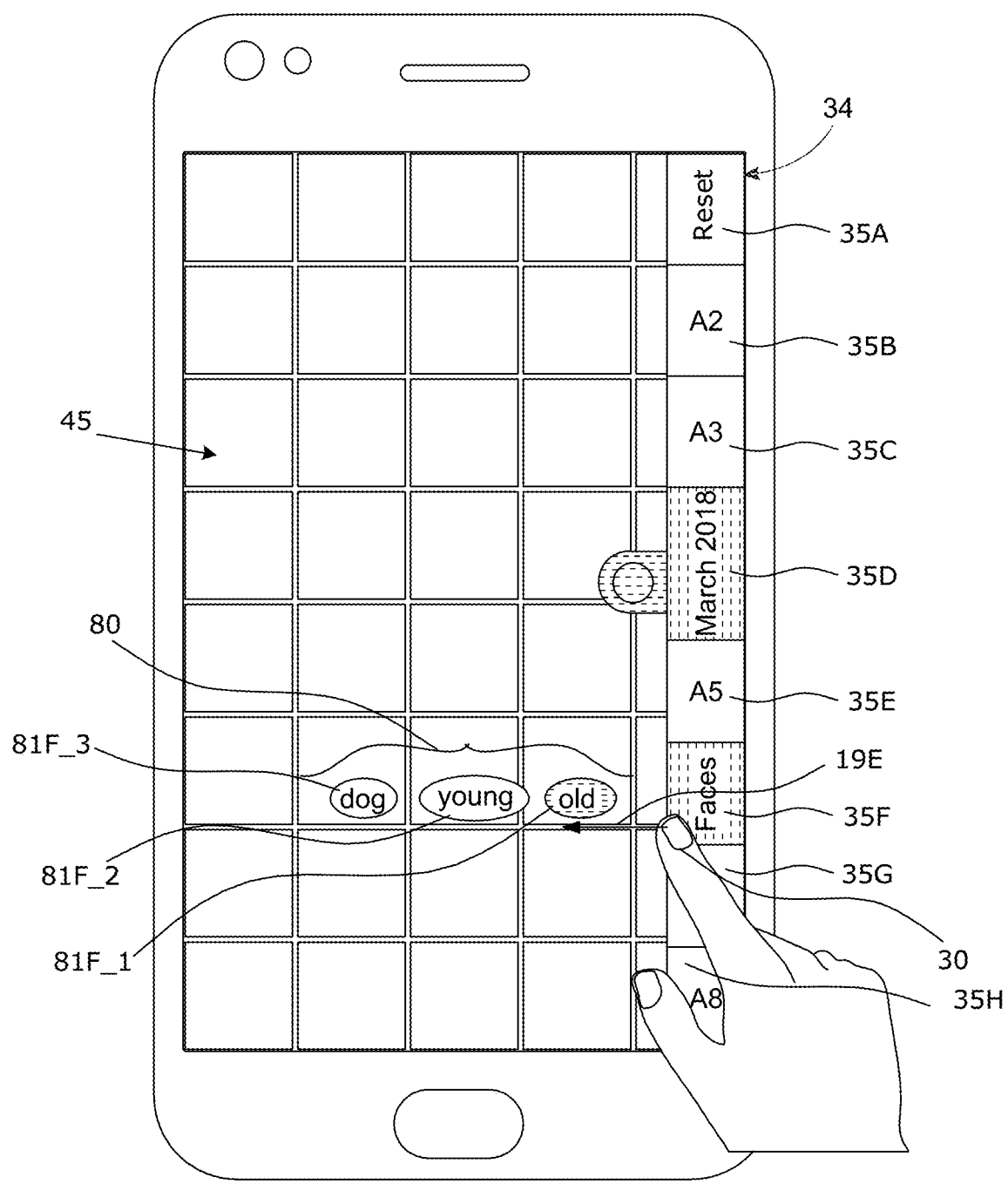
FIG. 11 depicts the electronic device of FIG. 10, wherein the viewing area is showing a nominal attribute radio button control group corresponding to an activated nominal attribute representing a face type.
Figure 12:
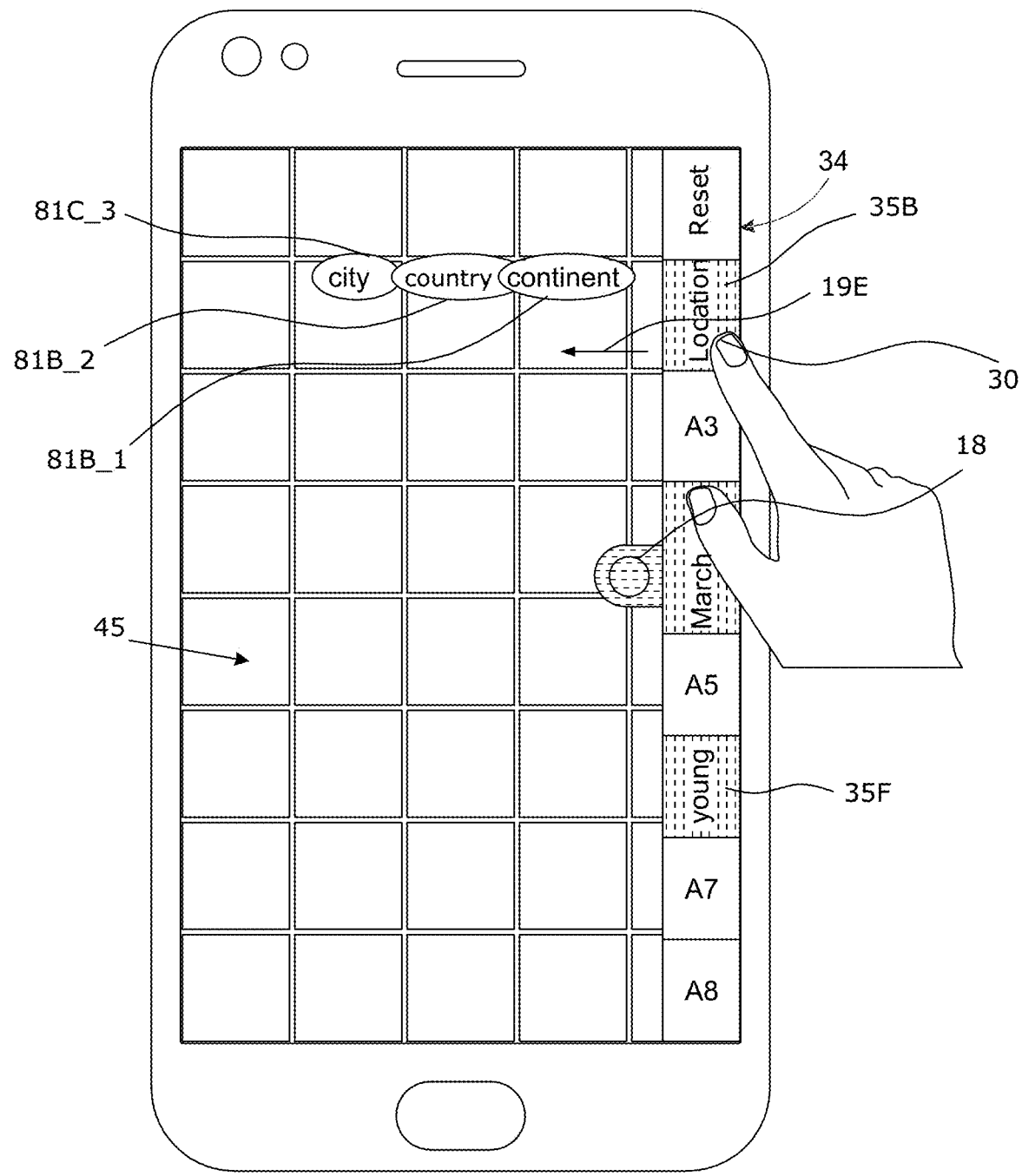
FIG. 12 depicts the electronic device of FIG. 10, wherein the viewing area shows a plurality of ordinal attribute field controls corresponding to an activated ordinal attribute representing location.

The attribute activation view 34 may also contain nominal attributes which have a number of discrete values. FIG. 11 depicts activating a nominal attribute, such as the "Faces" attribute. The "Faces" attribute is activated by first touching the corresponding attribute activation element 35F, for example by a finger 30 then swiping to the left in the direction 19E. The "Faces" attribute has 3 possible values: "old", "young", and "dog" represented by the nominal radio button attribute field controls 81F_1, 81F_2 and 81F_3 respectively. In response to the activation of the "Faces" attribute, the nominal attribute radio button control group 80 is displayed as described above with reference to FIG. 8. To select the desired nominal attribute value, the finger 30 is further swiped in the direction 19E towards the middle of the viewing area 102 until it is aligned with the corresponding radio button attribute field control 81. Then the finger 30 is swiped upwardly to manipulate the radio button control 81 as discussed above. If it is desired, for example, to restrict a list of images to the ones containing "young" people, the finger 30 is swiped in the direction 19E until it is aligned with the nominal radio button attribute field control 81F_2. Then the finger 30 is swiped upwardly until it is on top of the nominal radio button attribute field control 81F_2. When the finger 30 is lifted off the nominal radio button attribute field control 81F_2, the nominal attribute value corresponding to the nominal attribute "Faces" is set to "young". Accordingly, also in response to lifting the finger 30 off the screen, the content being displayed on the touchscreen display 45 is filtered such that only photos meeting the criteria that they are of "young" people are displayed. As shown in FIG. 12, the attribute activation element 35F has been updated to indicate that the "Faces" attribute has been activated and set to the value "young".

Figure 13:
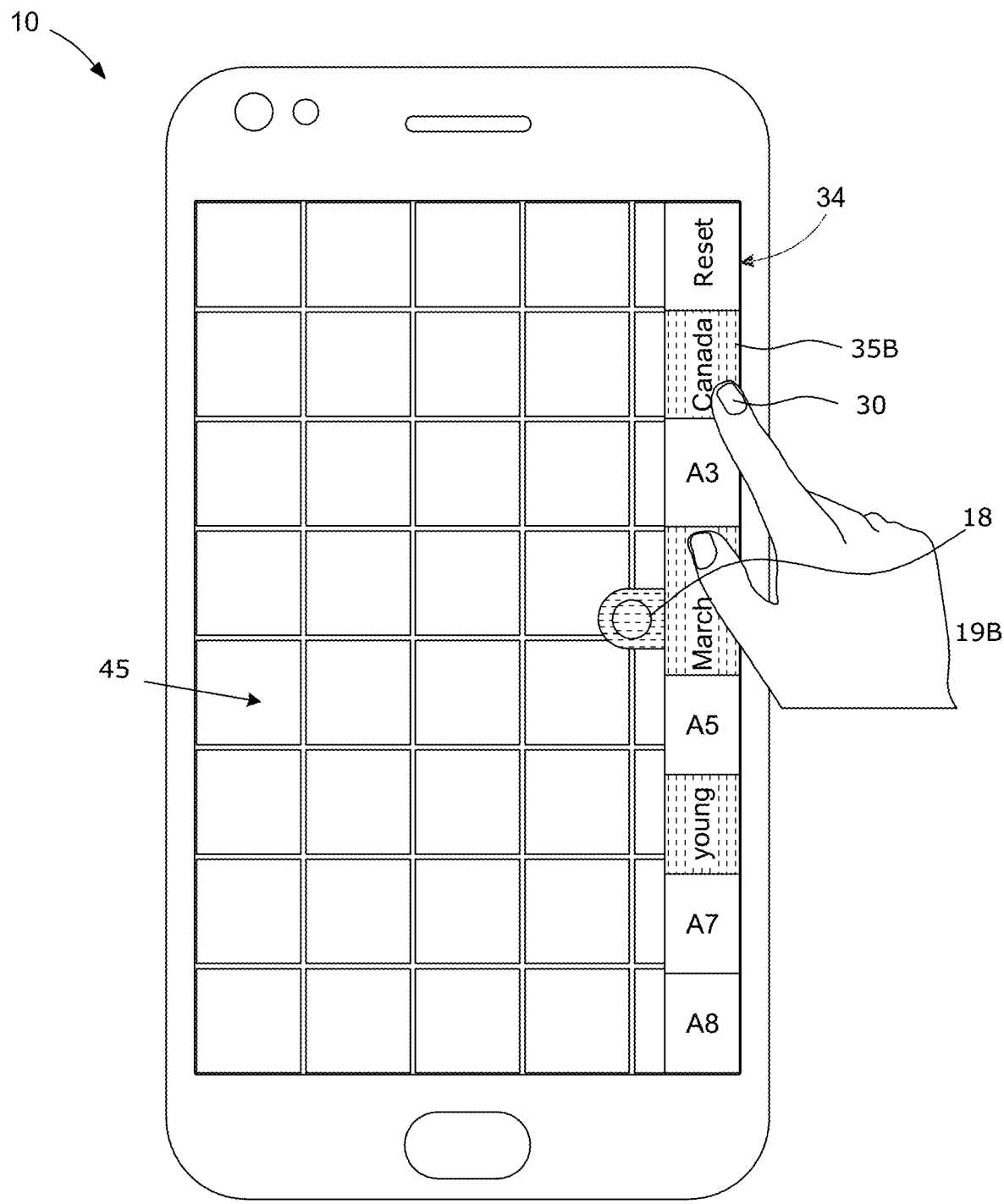
FIG. 13 depicts the electronic device of FIG. 12, wherein the location attribute is being deactivated by tapping the corresponding attribute activation element.

More than two attributes can be activated and assigned values to further filter or scroll through the list 200. FIG. 12 shows the activation of a third attribute, which is "Location", by touching the corresponding attribute activation element 35B and then swiping in the direction 19E. In response to the activation of the "Location" attribute, the attribute field button controls 811_1, 81B_2 and 81B_3 are displayed. The attribute field button control 81B_1 allows filtering a list of elements by continent, the attribute field button control 81B_2 allows filtering the list by country and the attribute field button control 81B_3 allows filtering by city. In an example embodiment, the values corresponding to each button control are limited to values that apply to the list 200 being displayed. For example, when the finger 30 is further swiped, in the direction 19E, until it is aligned with the attribute field control 81B_1 which corresponds to the continent, the finger 30 may be further swiped upwardly or downwardly to select a continent. However, if the list 200 contains elements 210 having continent attributes corresponding to only "North America" and "Asia", then other continent values are not shown in response to the upward and downward swipes. Furthermore, due to the relationship between the continent, country and city, selecting one attribute field value may affect other field values. For example, if the finger 30 is swiped until it is aligned with the city radio button control 81C_3, then swiped upwards. The city field control changes to display city names corresponding to elements 210 in the list 200. If the city "Montreal" is selected and the finger 30 is lifted, then the city attribute is set to "Montreal". Furthermore, the country attribute is set to "Canada" and the continent is set to "North America". As another example, if it is desired to show any elements 210 of the list 200, which have a country field value of "Canada", then the finger 30 is swiped in the direction 19E until it is aligned with the attribute field control 81B_2 and then swiped up or down until the value "Canada" is selected. In this case, the continent is automatically set to "North America" and the city is set to any city, i.e. it may just be left blank to match any city in Canada. Accordingly, if the list 200 comprises a plurality of images, only images taken in Canada are displayed. FIG. 13 shows the location attribute represented by attribute activation element 35B as being set to "Canada".

Figure 14:
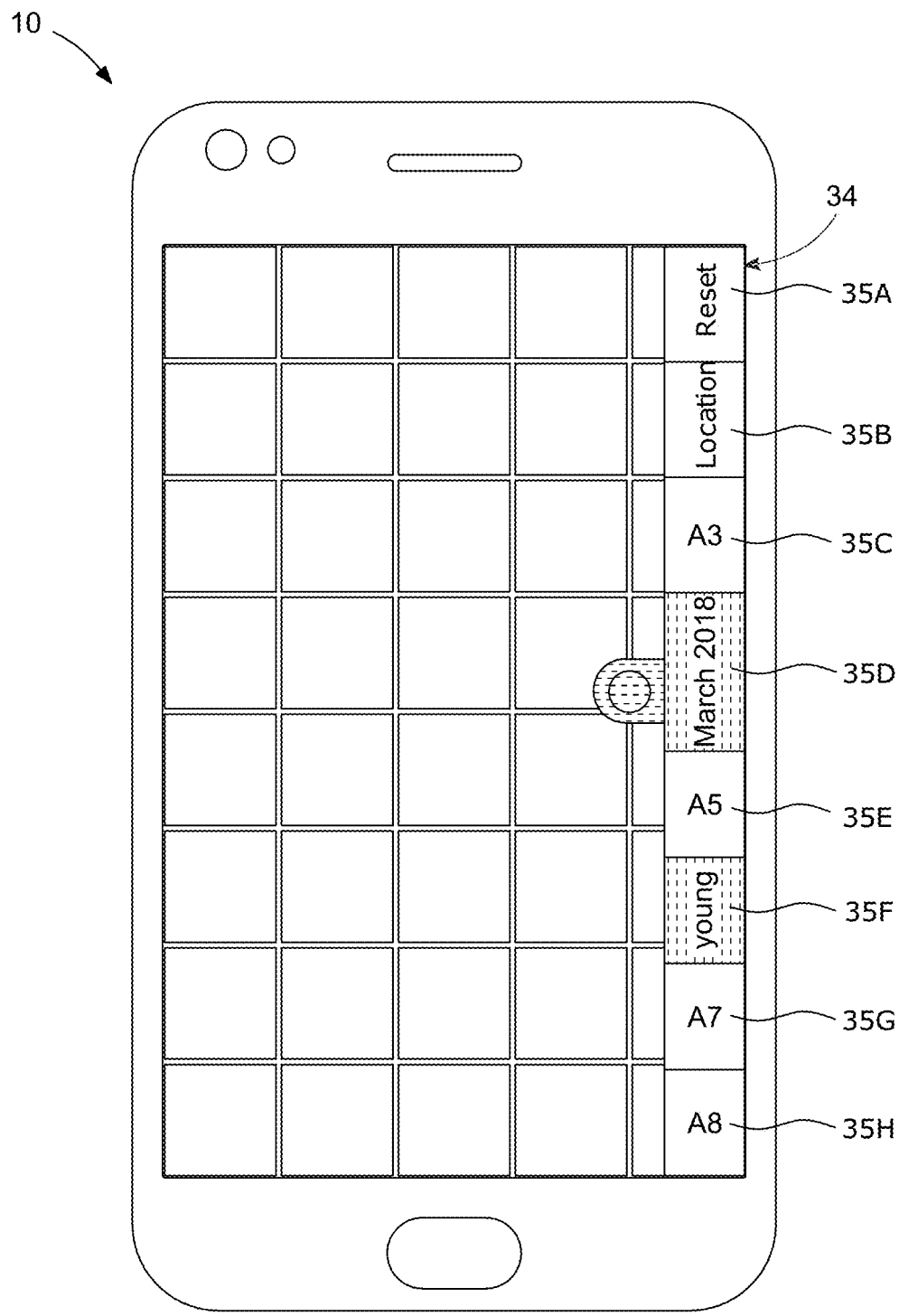
FIG. 14 depicts the electronic device of FIG. 13 wherein the location attribute has been deactivated in response to the tapping.

If it is desired to clear an active attribute, the corresponding attribute activation element 35 is tapped. For example, as shown in FIG. 13, the "Location" attribute, which is set to "Canada", can be cleared by tapping the attribute activation element 35B by a finger 30. The "Location" attribute is cleared as shown in FIG. 14. The attribute activation element 35B corresponding to "Location" simply indicates "Location" and no longer displays the selected location field value "Canada". Additionally, the attribute activation element 35B is not highlighted indicating that it is not taken into account in any filtering or scrolling. If it is desired to clear all the attributes, then tapping the attribute activation element 35A will activate a reset command that clears all settings for the attribute activation elements 34B-34H. Alternatively, one can tap each active attribute activation element 35 to deactivate it and clear all its settings.

Figure 15A:
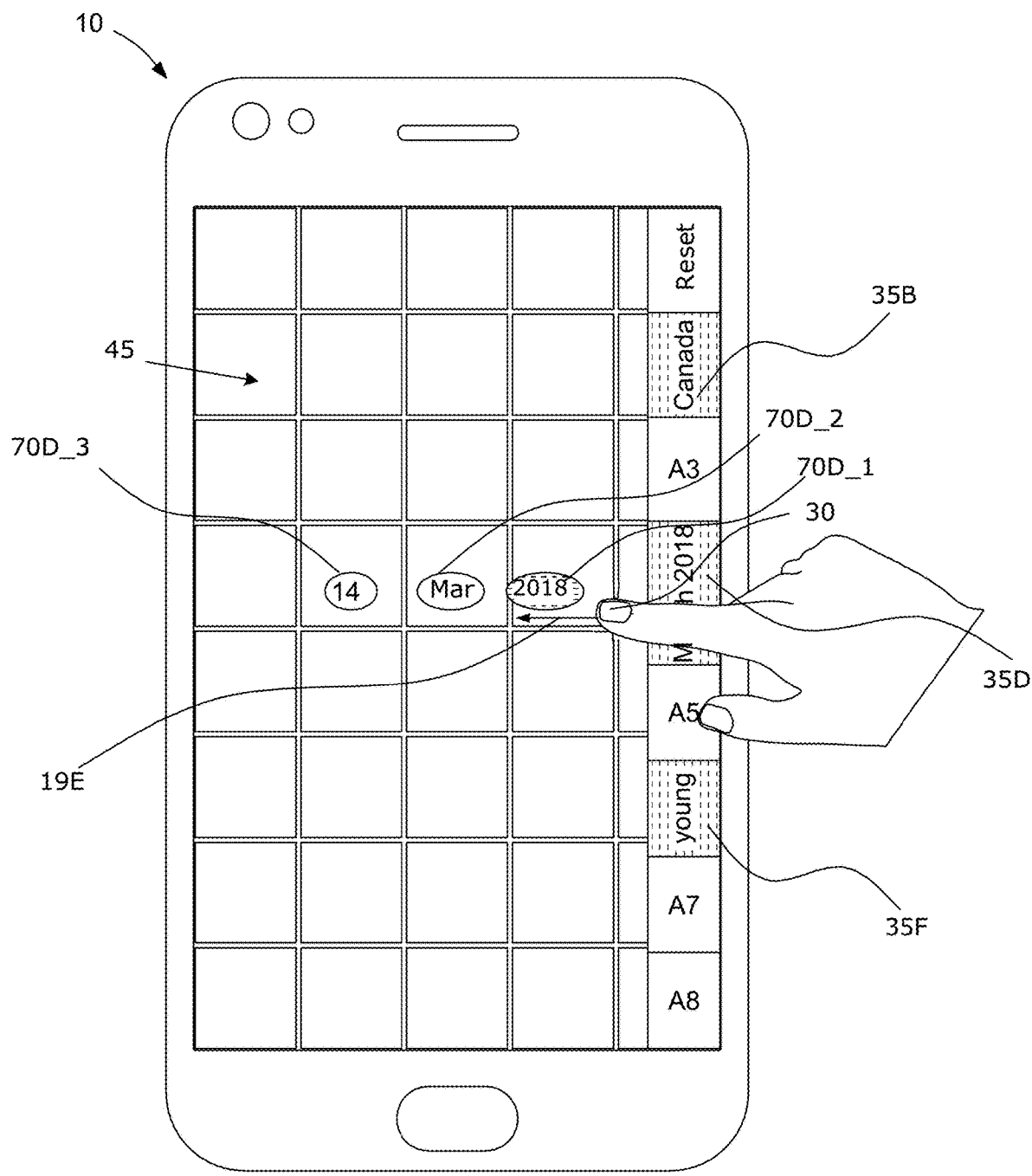
FIG. 15A depicts the electronic device of FIG. 12, wherein the location, time, and faces attributes have been activated and a finger is in alignment with time attribute's activation element.
Figure 15B:
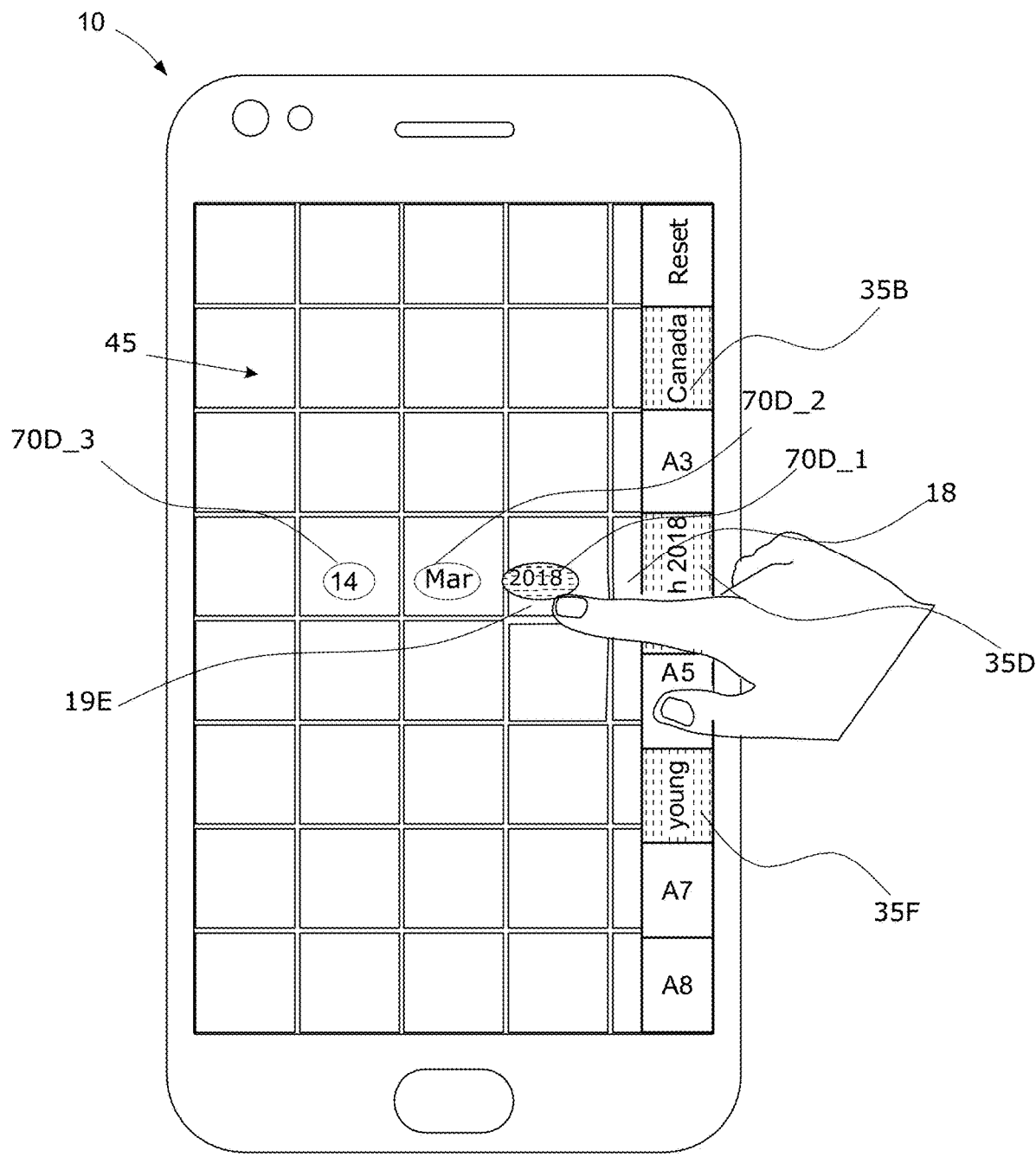
FIG. 15B depicts the electronic device of FIG. 15A, wherein the finger is in alignment with an ordinal attribute field control of the time attribute.

With reference to the attribute activation elements: 35B, 35D and 35F, in FIG. 15A, the "Faces" attribute has been set to "young" as indicated by the attribute activation element 35F, the "Time" attribute has been set to "March 2018" as indicated by the attribute activation element 35D, and the "Location" attribute has been set to "Canada" as indicated by the attribute activation element 34B. Accordingly, a visible list portion 216 of a list of photos shown on the touchscreen display 45 is limited to photos of "young" people taken in "Canada" around March 2018. Further scrolling is possible using an active ordinal attribute. For example, in the shown figure, finger 30 is placed in alignment with the attribute activation element 35D which is already activated and shown as being highlighted. The finger 30 can be swiped to the left in the direction 19E to select a time attribute field control for use in scrolling. For example, the finger 30 can be swiped to the left until it is in alignment with and just below the attribute field control 70D_1, as shown in FIG. 15B. Then the finger 30 can be swiped up or down to increment or decrement the year attribute field value. In a descending list, an upward scrolling gesture under the attribute field control 70D_1 will increment the "Time" attribute by a single year at a time. For example, the "Time" attribute will be incremented to "March 2019", then to "March 2020". Accordingly, the visible list portion 216 of the list of photos is scrolled accordingly and displays photos of "young" people taken in "Canada" around March 2019 and then around March 2020, respectively. In another example, the finger 30 is further swiped to the left, in the direction 19E, until it is in alignment with the attribute field control 70D_2, which represents the month field of the "Time" attribute. Further swiping the finger 30 in an upward scrolling gesture, will increment the "Time" attribute by a single month. The "Time" attribute in that case will have a value of 14 Apr. 2018. The list 200 which may be comprises of images, is scrolled to show pictures of young people in Canada taken around 14 Apr. 2018.

In some example embodiments, when no interactions with the attribute activation view 34 takes place for a predetermined period of time, then the attribute activation view 34 disappears from the viewing area 102 of the touchscreen display 45, as shown in FIG. 16. Similarly, in some embodiments, when no interactions with the scrubber 18 take place for a predetermined period of time, the scrubber 18 is removed from the touchscreen display 45, as shown in FIG. 17.

Figure 18:
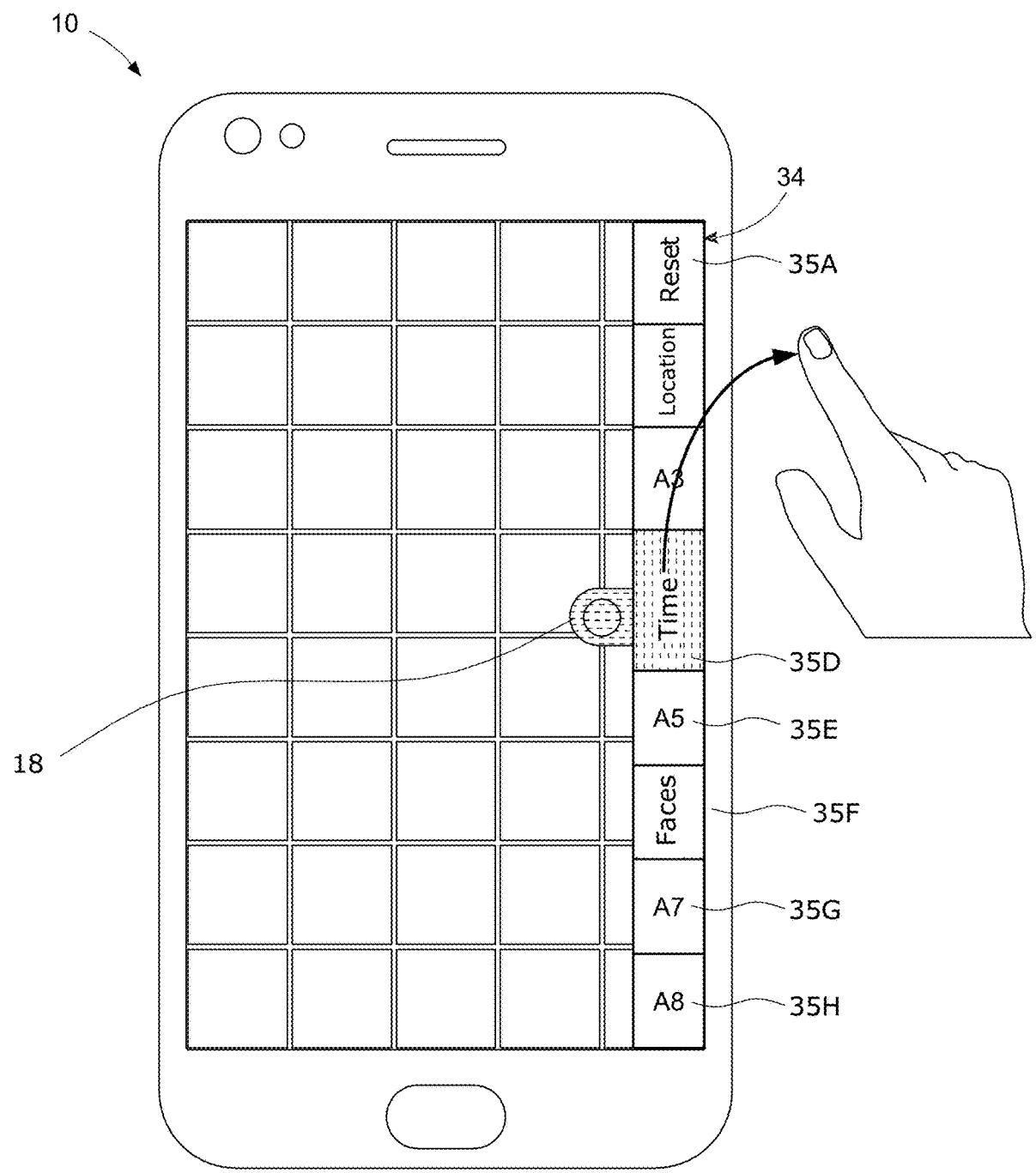
FIG. 18 depicts an electronic device having a touchscreen display including a viewing area showing an attribute activation view in a first configuration and being scrolled by a touch flick, in accordance with some example embodiments.
Figure 19:
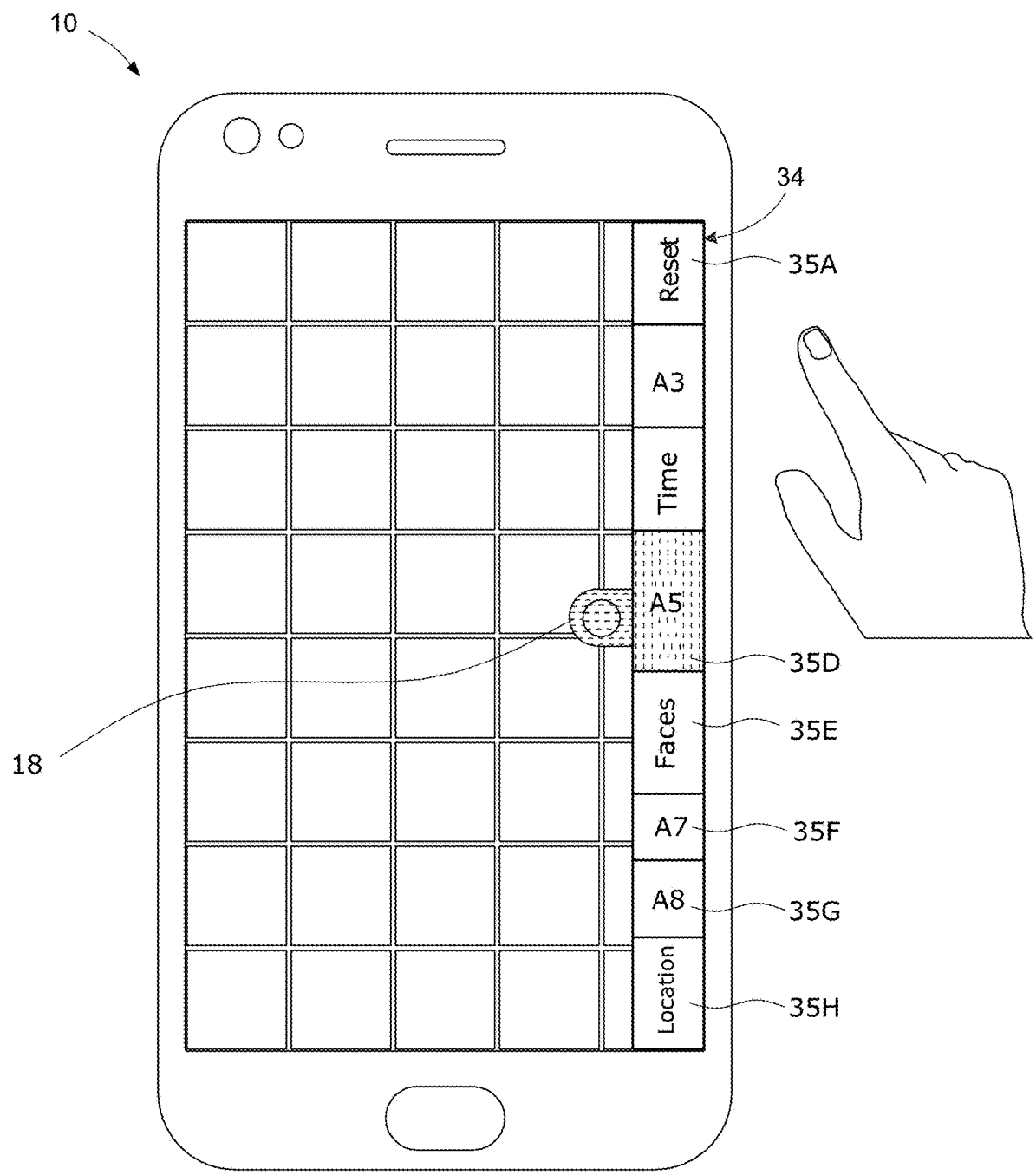
FIG. 19 depicts the electronic device of FIG. 18 wherein the scrollable attribute activation view in a second configuration in response to the touch flick.
Figure 20:
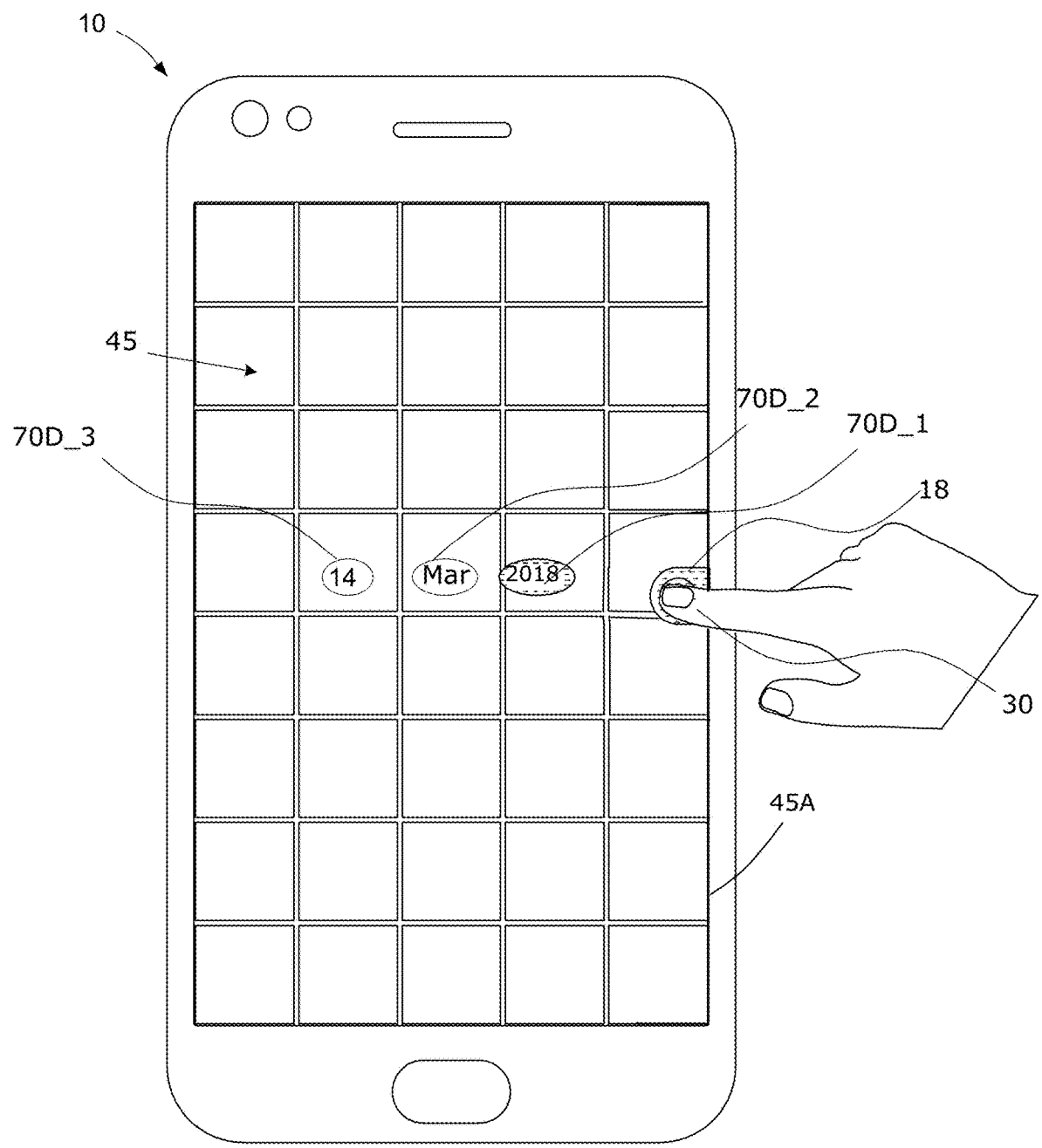
FIG. 20 depicts the electronic device of FIG. 10, wherein the attribute activation view is hidden during swiping towards the attribute field controls, in accordance with some embodiments.

While touching an attribute activation element 35, and swiping in the direction 19E towards the middle of the screen has been shown as a method for activating a particular attribute, other alternative methods are contemplated. With reference to FIGS. 18-20, there is presented a method for selecting an attribute of an element 210 of a list 200, the attribute used to affect either scrolling or filtering the list 200. In the presented method, an attribute having an attribute activation element 35 in alignment with the scrubber 18 is considered the active attribute. The attribute activation view 34 is scrollable using touch flicks. For example, with reference to FIG. 18, if it is desired to activate the attribute "A5" instead of the "Time" attribute, then the user touch flicks the attribute activation view 34 in the direction 39 as shown. The attribute activation elements 35B-35H scroll upwards by one position, as shown in FIG. 19. In this embodiment, the attribute activation element 35A is static since it is the element which resets the values of all attributes and is activated by a single tap. Accordingly, as shown in FIG. 19, the attribute "A5" is aligned with the scrubber 18 and is therefore the currently selected attribute. In FIG. 20, the scrubber 18 is touched while the "Time" attribute was aligned therewith as shown in FIG. 18. In response to touching the scrubber 18, the attribute view 34 is hidden from the viewing area 102 of the touchscreen display 45. The scrubber 18 is then displayed close to the edge 45A of the touchscreen display 45 as shown. The attribute field controls 70D can be manipulated as before, by swiping the finger 30 to the left until it is aligned with and just below any one of the attribute field controls 70D. The finger 30 can then be swiped up or down to increment or decrement the attribute value associated with the attribute field control 70D as described earlier.

Figure 21:
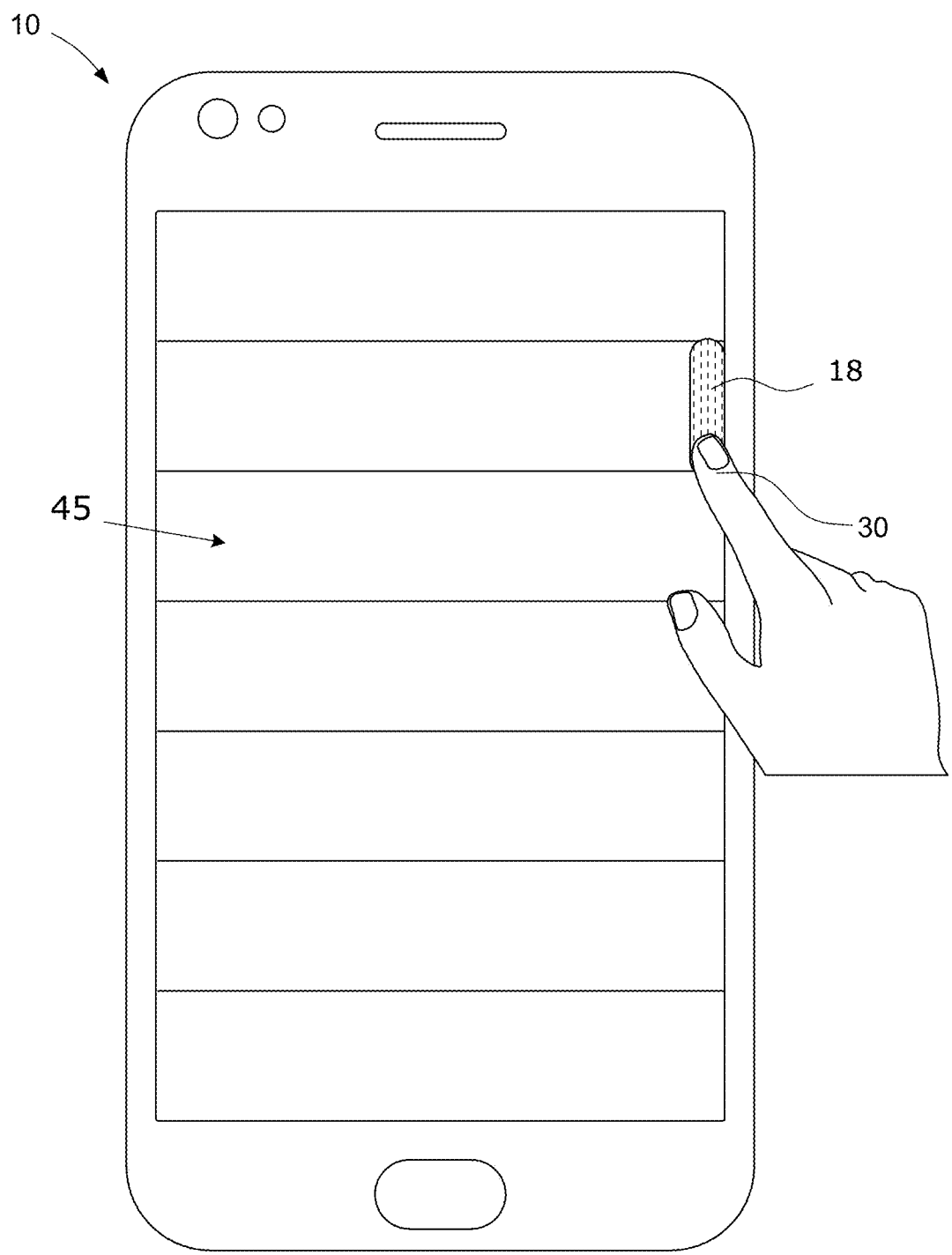
FIG. 21 depicts an electronic device having a touchscreen display including a viewing area showing a scrubber being touched by a user's finger, in accordance with some embodiments.
Figure 22:
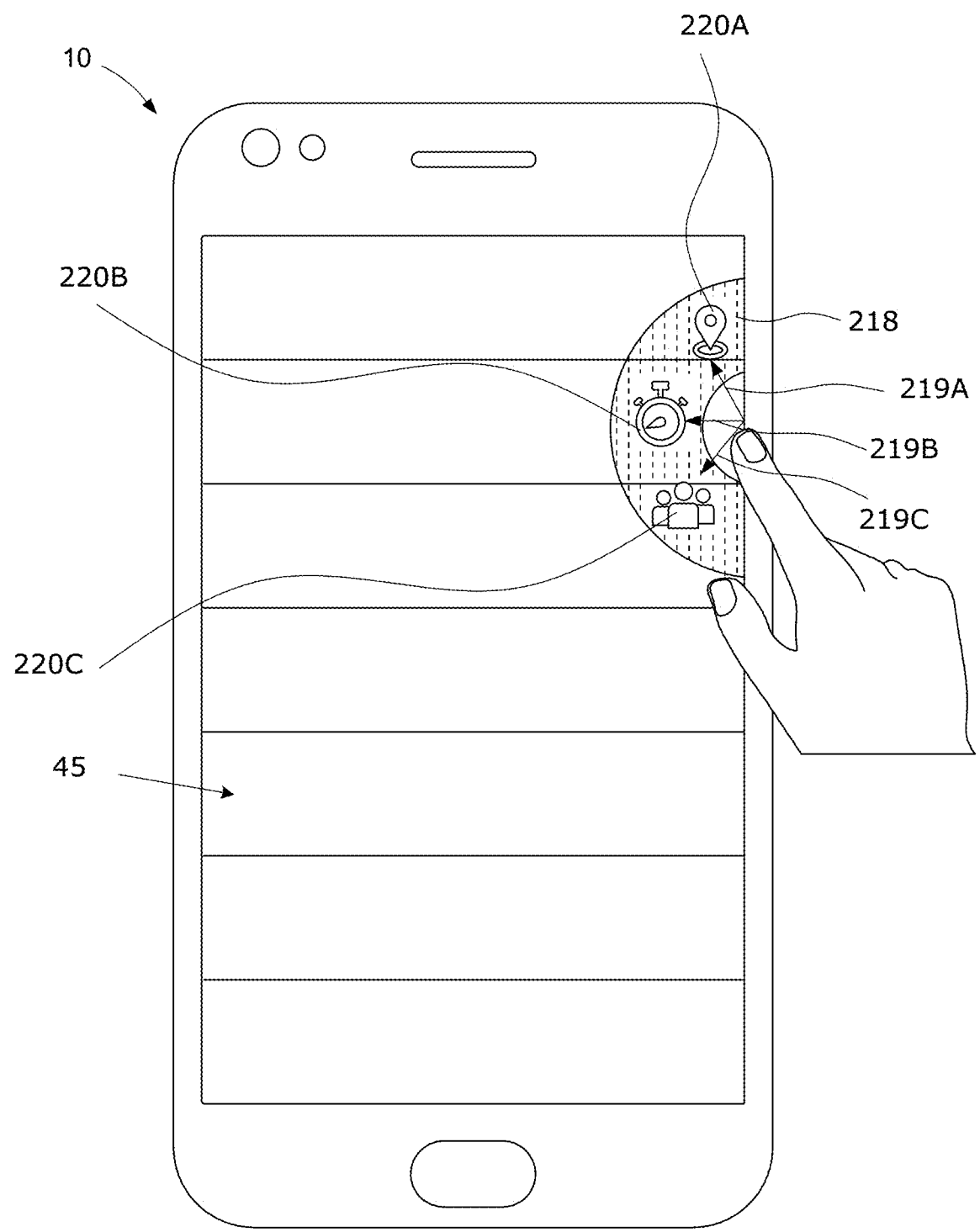
FIG. 22 depicts the electronic device of FIG. 21, wherein the scrubber has been expanded into an attribute activation view in response to the touch by the finger.
Figure 23:
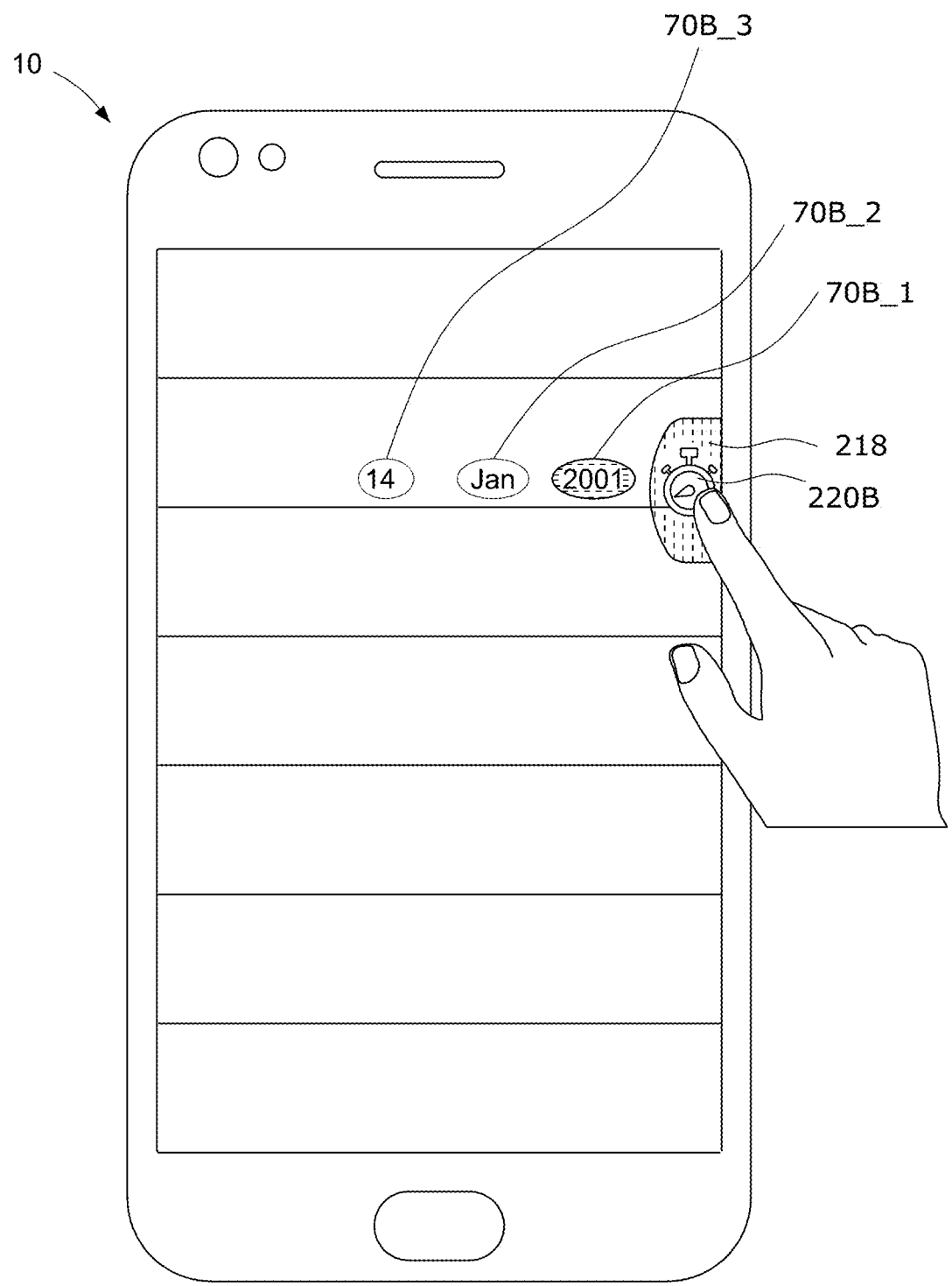
FIG. 23 depicts the electronic device of FIG. 22, wherein an attribute has been activated and a plurality of field attribute field controls have been displayed in response to the activation.
Figure 24:
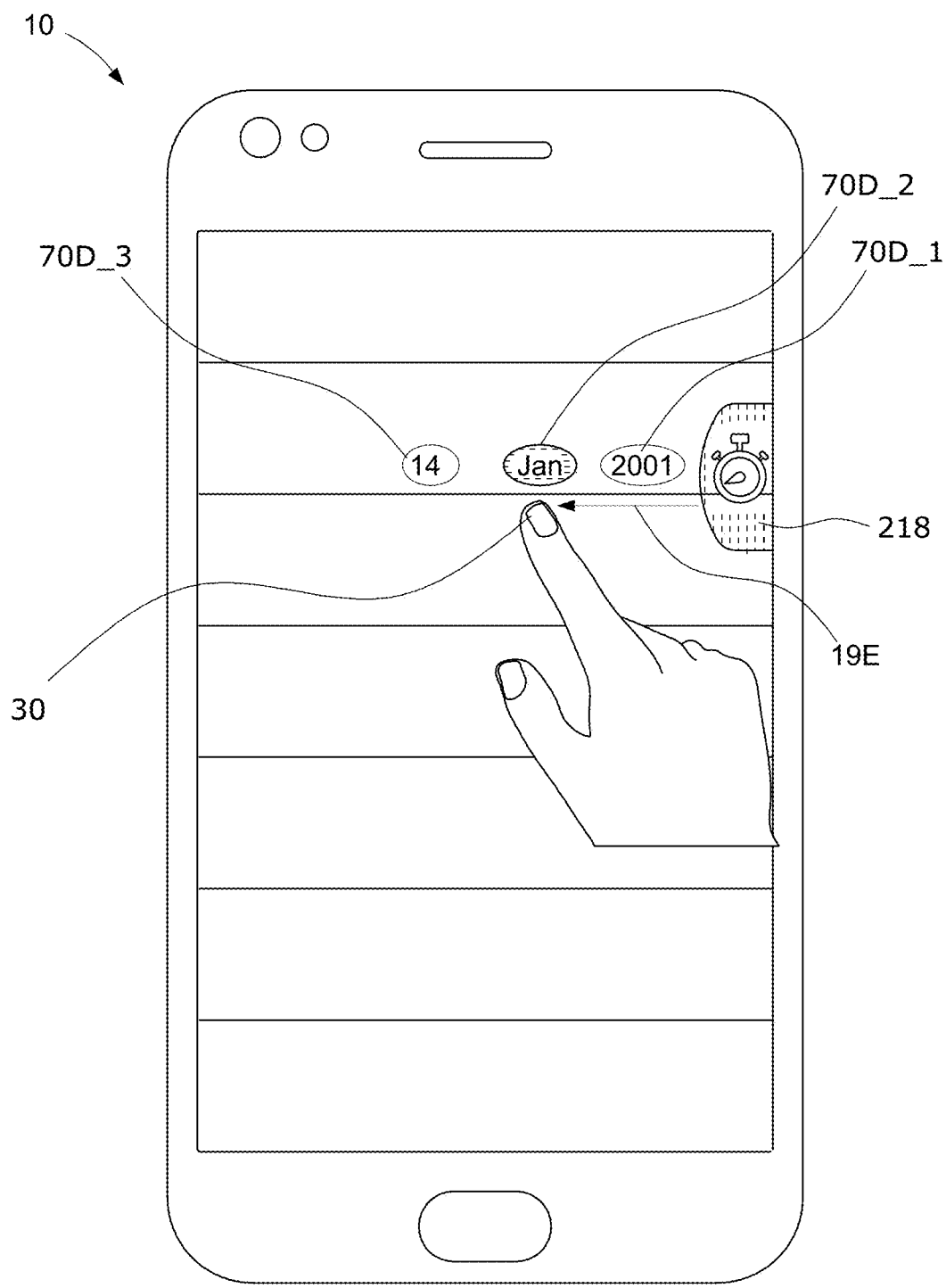
FIG. 24 depicts the electronic device of FIG. 23, wherein a first field attribute controls is being selected via a swipe gesture.

In the example embodiments presented, the attribute selection and/or activation views have had a longitudinal configuration and have been displayed near one edge of the touchscreen display 45. Other example embodiments, shown with reference to FIGS. 21-25, use a semi-oval attribute activation view 218. With reference to FIG. 21, an electronic device having a touchscreen display 45 including a viewing area 102 is shown. A scrubber 18 is displayed proximate the right edge 45A of the touchscreen display 45. The scrubber 18 is shown being touched by a finger 30. In response to receiving the touch, the scrubber 18 is expanded into an attribute activation view 218, as shown in FIG. 22. In this embodiment the attribute activation view 218 is semi-circular in shape. The attribute activation view 218 includes attribute activation elements 220A, 220B and 220C corresponding to a location, time and person attribute, respectively. FIG. 22 also shows the directions in which the finger 30 can be swiped to select and activate a particular attribute. For example, swiping the finger 30 in the direction of arrow 219A until it is touching the attribute activation element 220A causes the corresponding attribute, location, to be activated. Similarly, swiping the finger 30 in the direction of arrow 219B until it is touching the attribute activation element 220B, activates the corresponding attribute, time. Swiping the finger 30, in the direction of arrow 219C until it is touching the attribute activation element 220C activates the person attribute.

Figure 25:
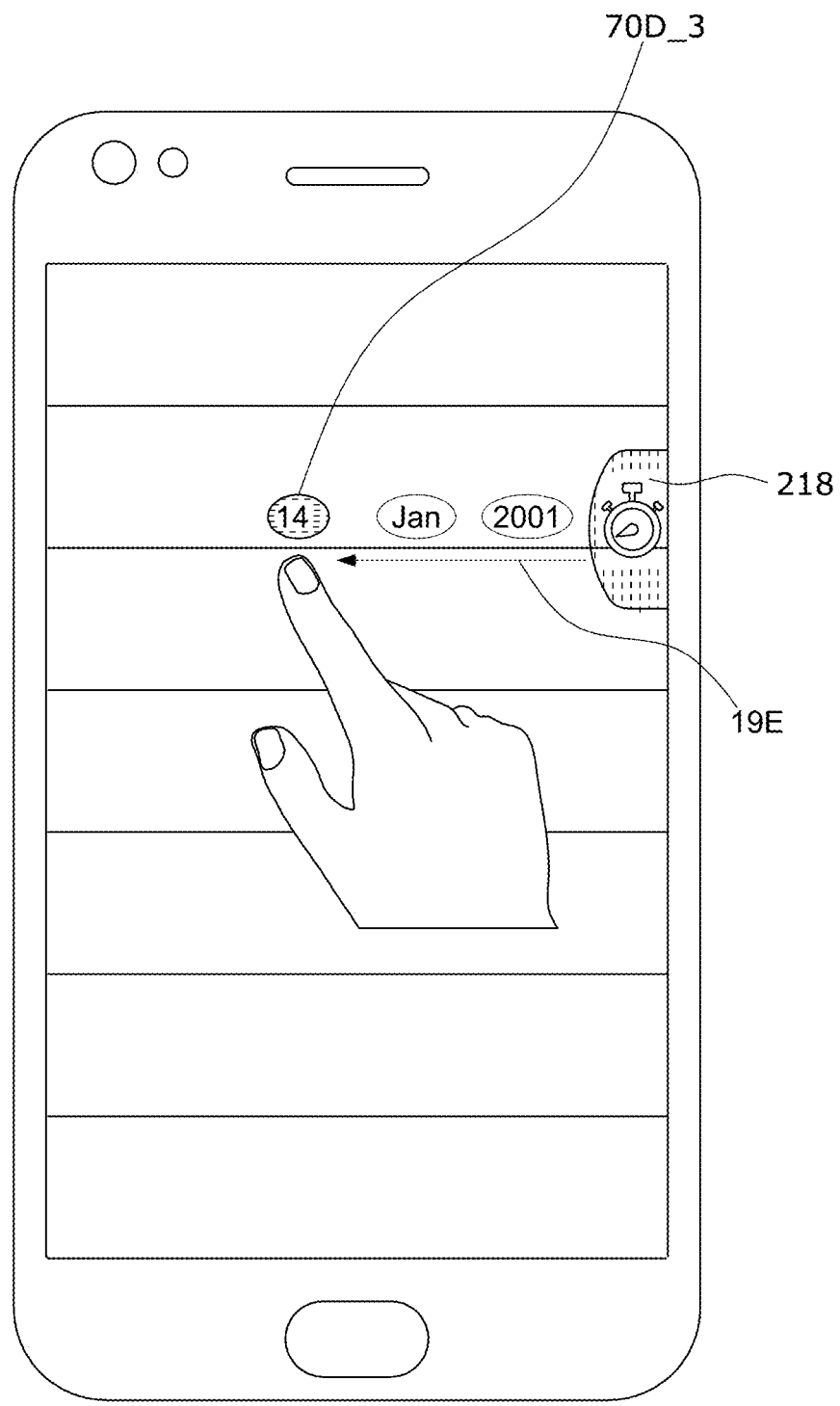
FIG. 25 depicts the electronic device of FIG. 23, wherein a second field attribute controls is being selected via a swipe gesture.

In response to activating one of the attributes, the attribute activation view 218 is reduced to show only the attribute activation element 220 of the activated attribute. For example, with reference to FIG. 23, the attribute activation view 218 only shows the attribute activation element 220B which corresponds to the time attribute. Additionally, the ordinal attribute field controls 70D_1, 70D_2, and 70D_3 (collectively "70D") corresponding to the year, month and date are displayed. At this point the finger 30 may be further swiped to the left to be aligned with an attribute field control 70D, and then swiped up or down to adjust the value of the attribute field control 70D as described earlier. For example, with reference to FIG. 24, the finger 30 is aligned with the attribute field control 70D_2 and may be used to manipulate the month, as discussed above. Similarly, as shown in FIG. 25, the finger 30 may be further swiped to the left until it is aligned with the attribute field control 70D_3 and may be used to manipulate the date, as discussed above. After a period of scrolling inactivity, the attribute view returns to being a scrubber as displayed in FIG. 21.

Figure 26:
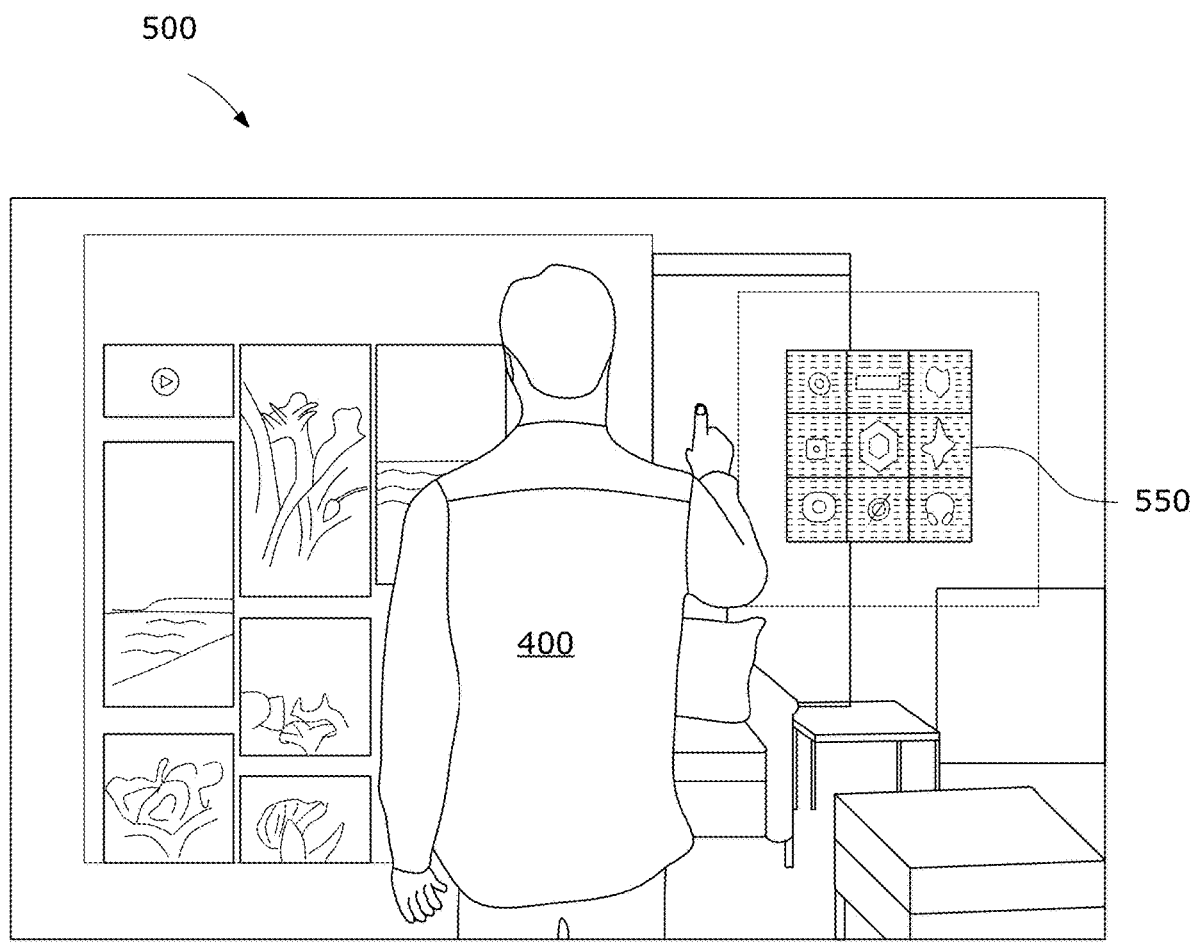
FIG. 26 depicts an augmented reality system employing the methods described herein.
Figure 27:
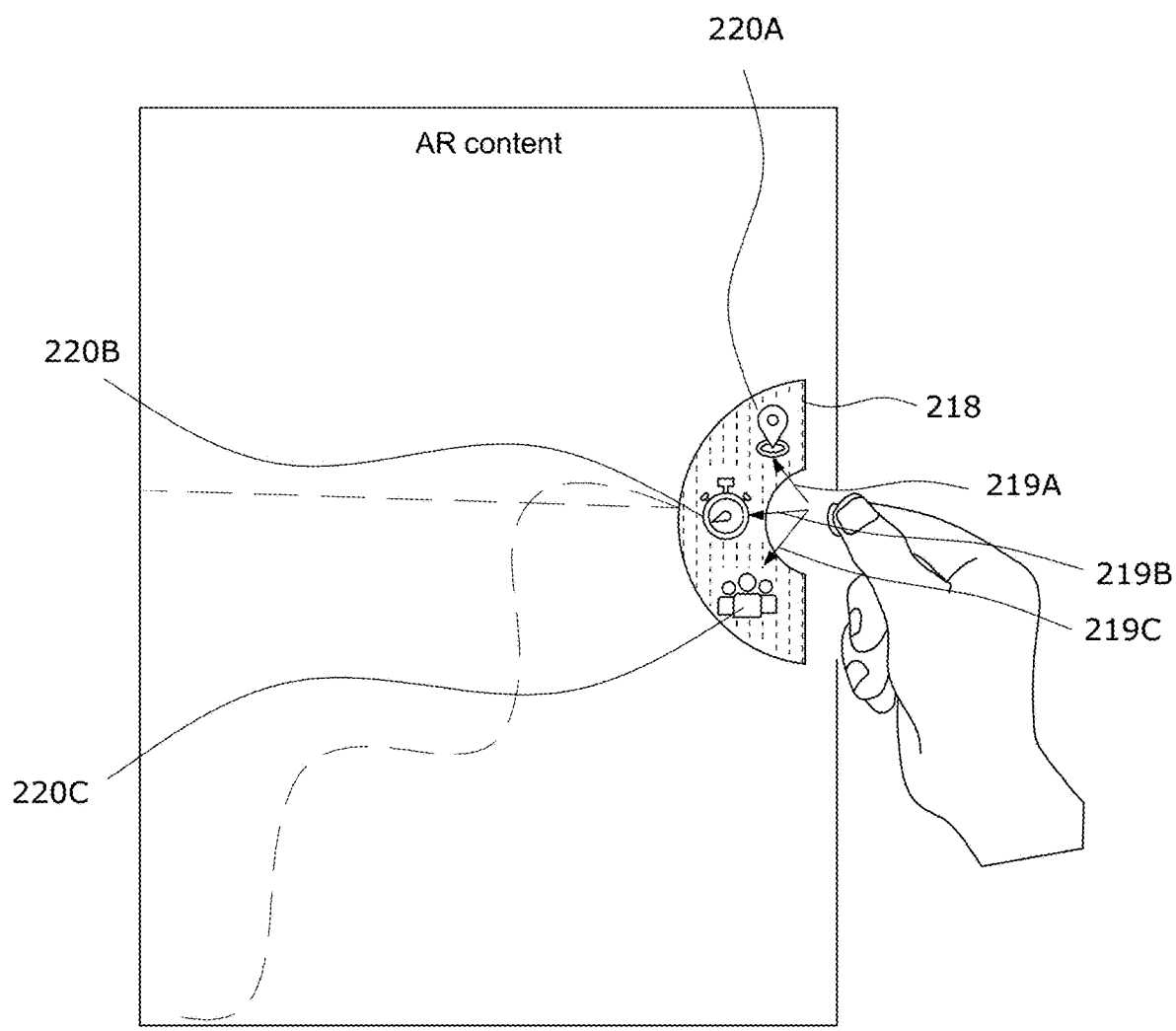
FIG. 27 depicts a user interface for use in conjunction with the augmented reality system of FIG. 26 to select an attribute for scrolling or filtering.

The use of the method and user interface elements for scrolling and filtering a list of items is not limited to touch screen displays on electronic devices, and can be used with virtual reality and augmented reality systems. For example, with reference to FIG. 26, an augmented reality system 500 is shown. A person 400 is using an augmented reality display 550 and wishes to filter or scroll through a list of elements 200 as describe above. In an example embodiment the system responds to an air gesture by the user's hand 530. For example, the user may pinch the hand 530 and moves it to grab a virtually displayed scrubber 18. In response, the scrubber expands to an attribute activation view 218 as shown in FIG. 27. The user may swipe the hand 530 in mid-air, while still in a pinch configuration, in any one of the directions 219 towards a corresponding attribute activation element 220 to activate a corresponding attribute. The hand 530 may then me moved towards the left to be aligned with an attribute activation field and used to adjust the value of that field as described above but using mid-air hand gestures instead of swipes.

Figure 28:
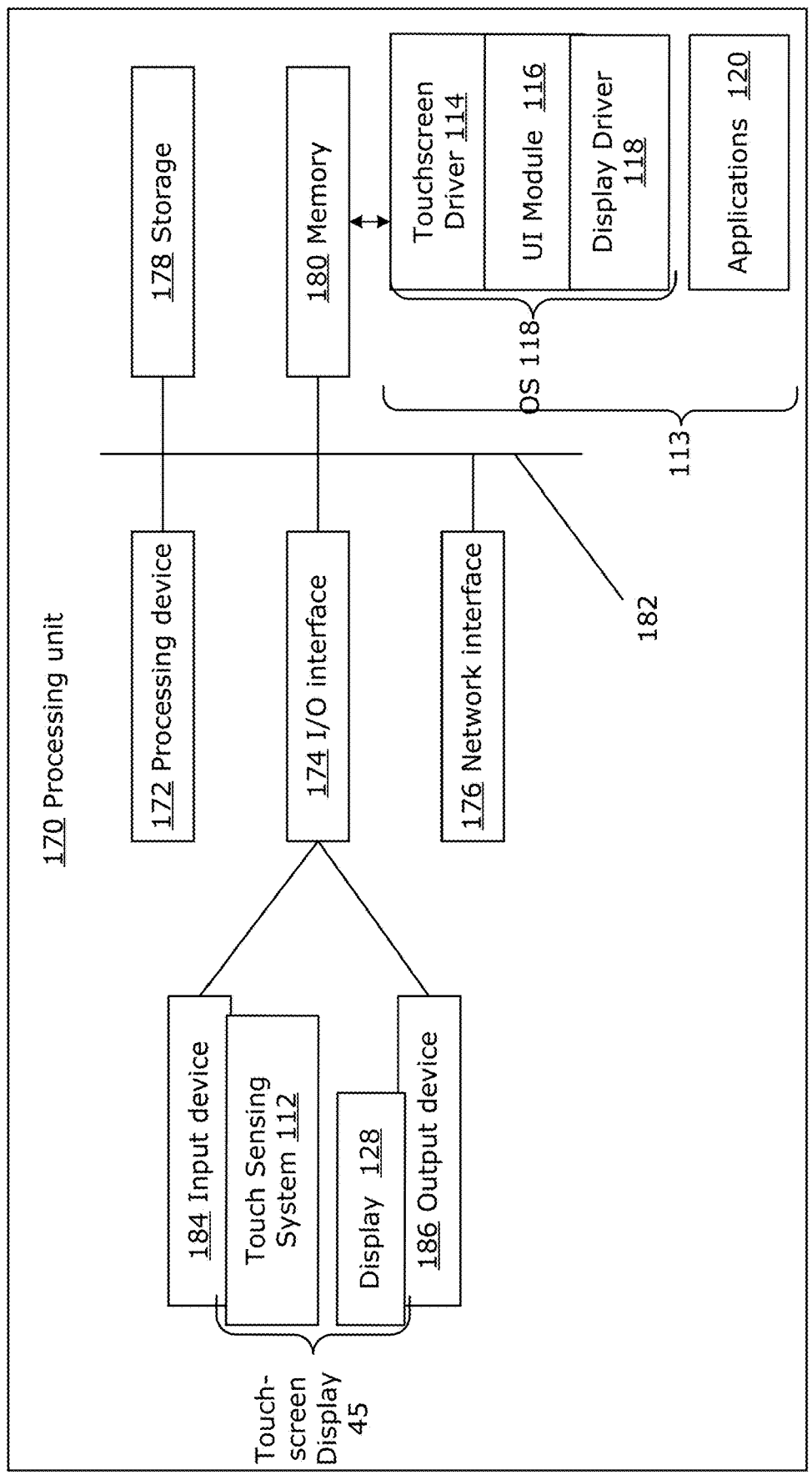
FIG. 28 is a block diagram representing an example electronic device capable of carrying out the methods described herein.

FIG. 28 is a block diagram of an example processing unit 170, which includes the components of touchscreen display system 110 and may be used to implement the electronic device 10. The processing unit 170 may be used to execute machine readable instructions, in order to implement methods and examples described herein. Other processing units suitable for implementing embodiments described in the present disclosure may be used, which may include components different from those discussed below. Although Figure shows a single instance of each component, there may be multiple instances of each component in the processing unit 170.

The processing unit 170 may include one or more processing device(s) 172, such as a processor, a microprocessor, an application-specific integrated circuit (ASIC), a field-programmable gate array (FPGA), a dedicated logic circuitry, or combinations thereof. The processing unit 170 may also include one or more input/output (I/O) interface(s) 174, which may enable interfacing with one or more appropriate input devices 184 and/or output devices 186. The processing unit 170 may include one or more network interface(s) 176 for wired or wireless communication with a network (e.g., an intranet, the Internet, a P2P network, a WAN and/or a LAN) or other node. The network interface(s) 176 may include wired links (e.g., Ethernet cable) and/or wireless links (e.g., one or more antennas) for intra-network and/or inter-network communications.

The processing unit 170 may also include one or more storage units 178, which may include a mass storage unit such as a solid state drive, a hard disk drive, a magnetic disk drive and/or an optical disk drive. The processing unit 170 may include one or more memories 180, which may include a volatile (e.g. random access memory (RAM)) and non-volatile or non-transitory memories (e.g., a flash memory, magnetic storage, and/or a read-only memory (ROM)). The non-transitory memory(ies) of memories 180 store programs 113 that include software instructions for execution by the processing device(s) 172, such as to carry out examples described in the present disclosure. In example embodiments the programs 113 include software instructions for implementing operating system (OS) 108 (which as noted above can include touchscreen driver 114, UI module 116 and display driver 118, among other OS components) and other applications 120 (e.g., mapping application 120A, graphics application 120B and data processing application 120C). In some examples, memory 180 may include software instructions for execution by the processing device(s) 172 to carry out the display content modifications described in this disclosure. In some other examples, one or more data sets and/or modules may be provided by an external memory (e.g., an external drive in wired or wireless communication with the processing unit 170) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 182 providing communication among components of the processing unit 170, including the processing device(s) 172, I/O interface(s) 174, network interface(s) 176, storage unit(s) 178 and/or memory(ies) 180. The bus 182 may be any suitable bus architecture including, for example, a memory bus, a peripheral bus or a video bus.

In FIG. 28, the input device(s) 184 include touch sensing system 112 of the touchscreen display 45, and may also include other input devices (e.g., a keyboard, a mouse, a microphone, accelerometer, and/or a keypad) Output device(s) 186 includes the display 128 of touchscreen display 45 and may also include other devices such as a speaker and a tactile generator.

Figure 29:
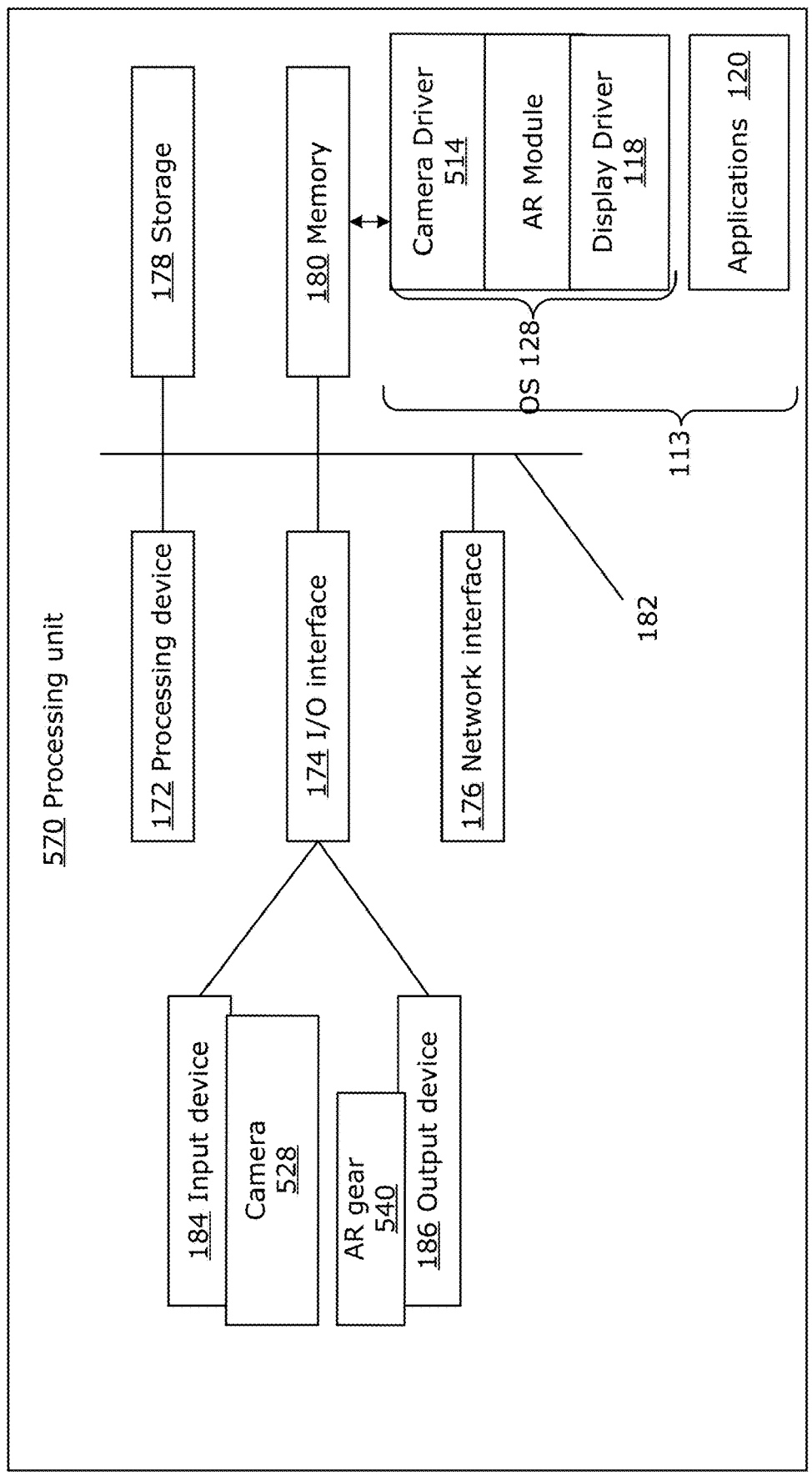
FIG. 29 is a block diagram representing an augmented reality system capable of carrying out the methods described herein.

FIG. 29 depicts a representation of a processing unit 570 which includes the components be used to implement the augmented reality system 500. The processing unit 570 may be used to execute machine readable instructions, in order to implement methods and examples described herein. Other processing units suitable for implementing embodiments described in the present disclosure may be used, which may include components different from those discussed below.

Although FIG. 29 shows a single instance of each component, there may be multiple instances of each component in the processing unit 570.

The processing unit 570 may include one or more processing device(s) 172, such as a processor, a microprocessor, an application-specific integrated circuit (ASIC), a field-programmable gate array (FPGA), a dedicated logic circuitry, or combinations thereof. The processing unit 170 may also include one or more input/output (I/O) interface(s) 174, which may enable interfacing with one or more appropriate input devices 184 and/or output devices 186. The processing unit 570 may include one or more network interface(s) 176 for wired or wireless communication with a network (e.g., an intranet, the Internet, a P2P network, a WAN and/or a LAN) or other node. The network interface(s) 176 may include wired links (e.g., Ethernet cable) and/or wireless links (e.g., one or more antennas) for intra-network and/or inter-network communications.

The processing unit 570 may also include one or more storage units 178, which may include a mass storage unit such as a solid state drive, a hard disk drive, a magnetic disk drive and/or an optical disk drive. The processing unit 170 may include one or more memories 180, which may include a volatile (e.g. random access memory (RAM)) and non-volatile or non-transitory memories (e.g., a flash memory, magnetic storage, and/or a read-only memory (ROM)). The non-transitory memory(ies) of memories 180 store programs 113 that include software instructions for execution by the processing device(s) 172, such as to carry out examples described in the present disclosure. In example embodiments the programs 113 include software instructions for implementing operating system (OS) 108 (which can include camera driver 514, AR (augmented reality) module 516 and display driver 118, among other OS components) and other applications 120 (e.g. photo viewing application). In some examples, memory 180 may include software instructions for execution by the processing device(s) 172 to carry out the display content modifications described in this disclosure. In some other examples, one or more data sets and/or modules may be provided by an external memory (e.g., an external drive in wired or wireless communication with the processing unit 170) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 182 providing communication among components of the processing unit 170, including the processing device(s) 172, I/O interface(s) 174, network interface(s) 176, storage unit(s) 178 and/or memory(ies) 180. The bus 182 may be any suitable bus architecture including, for example, a memory bus, a peripheral bus or a video bus.

In FIG. 29, the input device(s) 184 camera 528, and may also include other input devices (e.g., a keyboard, a mouse, a microphone, accelerometer, and/or a keypad) Output device(s) 186 includes the AR gear 540 of containing a display for viewing AR content and may also include other devices such as a speaker and a tactile generator.

Figure 30:
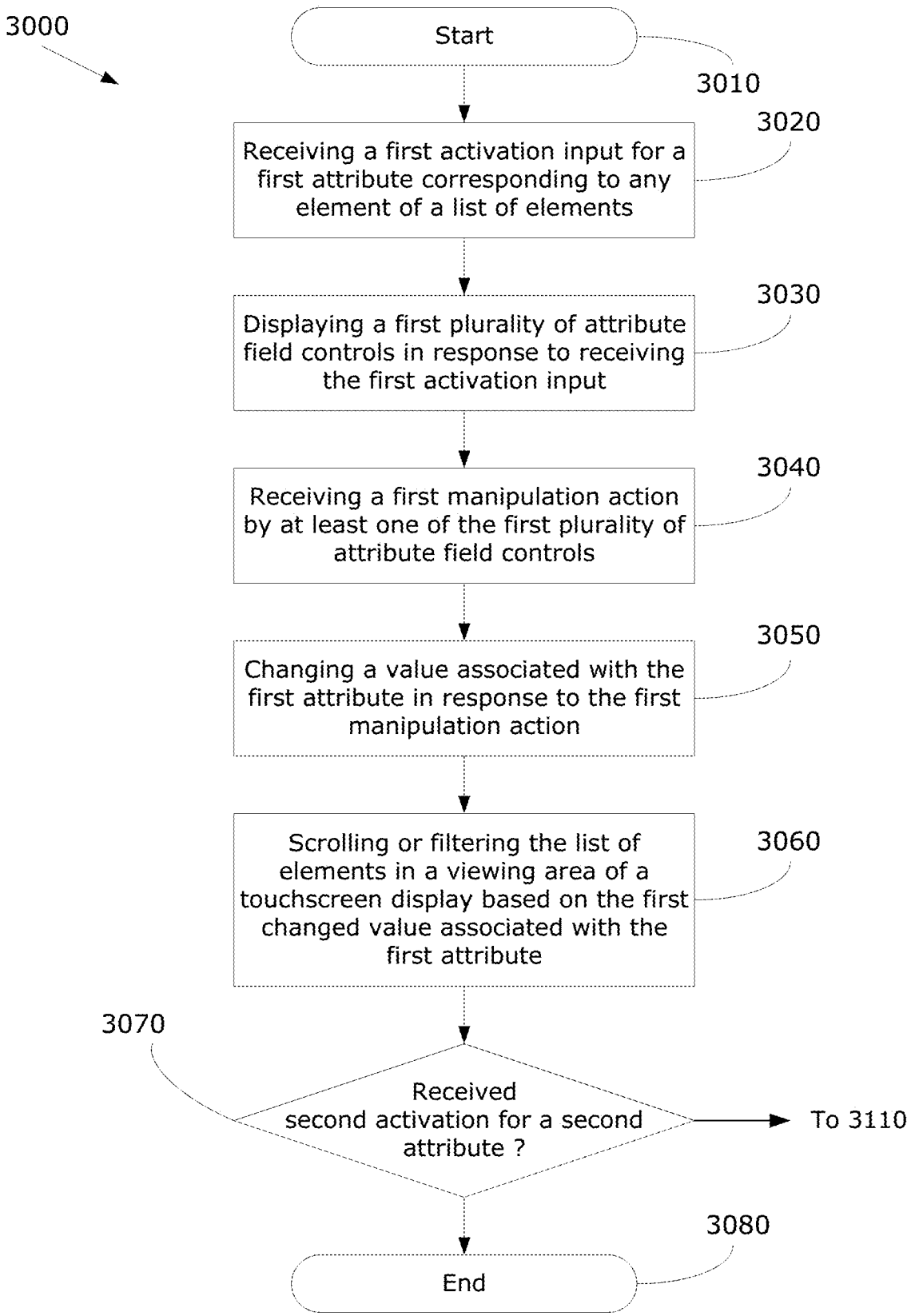
FIG. 30 depicts a method for scrolling or filtering a list of elements in a viewing area of a display on an electronic device, in accordance with example embodiments.
Figure 31:
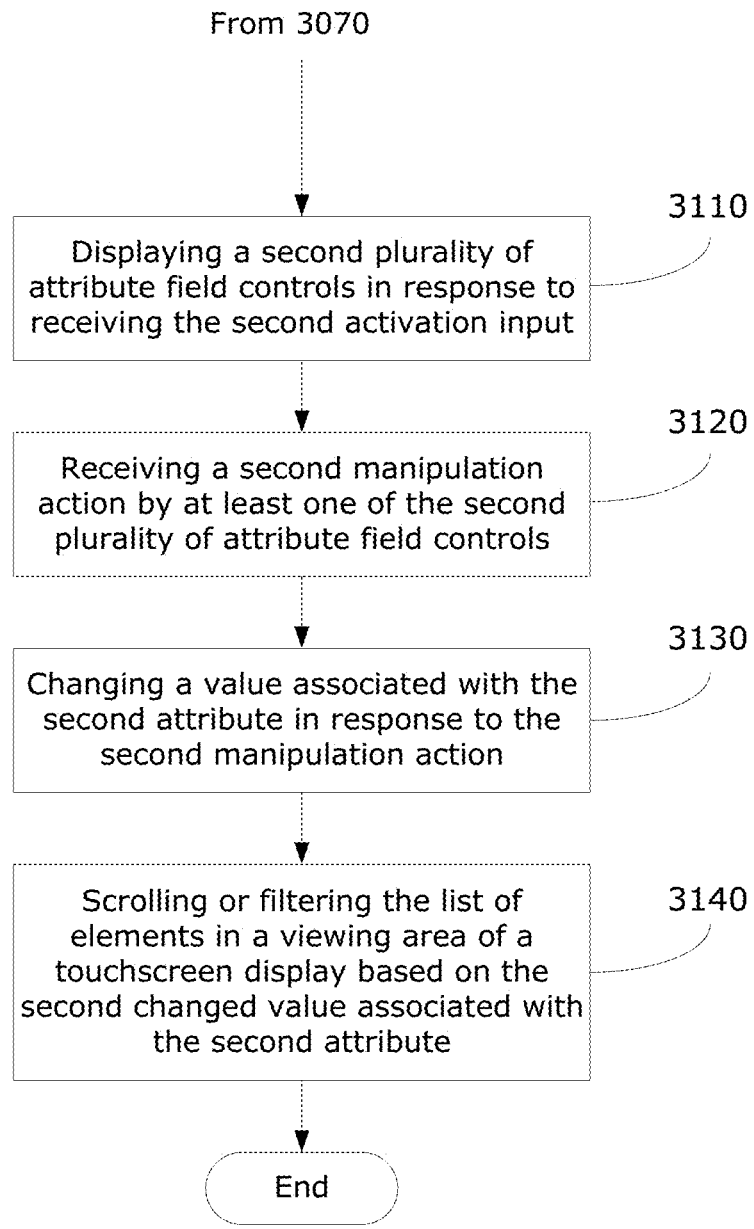
FIG. 31 depicts optional steps for the method of FIG. 30.

FIGS. 30 and 31 depict a method 3000, executed by an electronic device 10. The method 3000 is for scrolling or filtering a list of elements in a viewing area 102 of a touchscreen display 45 of the electronic device 10. The method starts at step 3010. At step 3020, a first activation input for a first attribute corresponding to any element of a list of elements is received. The activation input may be swiping to an SDT 32, swiping to an attribute activation element 35, or touching an attribute activation element 35. In response to receiving the first activation input, at step 3030 the electronic device 10 executes instructions which cause displaying a first plurality of attribute field controls, such as attribute field controls 70 or 81. At step 3040, at least one of the attribute field controls (70, 81) receives a manipulation action. The manipulation action may be touching part of an attribute field controls 70 to increment or decrement a field value associated with an ordinal attribute. The manipulation action may also be touching a radio button attribute field control 81 to select one of a plurality of values associated with a nominal attribute. At step 3050, in response to the manipulation action, the respective value of the first attribute is changed. At 3060, the list 200 is scrolled or filtered in the viewing area 102 of the touchscreen display 45 based on the first changed value of the first attribute. At step 3070, the electronic device executes instructions which check if a second activation for a second attribute of any element 210 of the plurality of elements 200 has been received. If no, the method ends at 3080 and is restarted whenever a first activation input is received per step 3020. If a second activation is received, control goes to step 3110 of FIG. 31. At step 3110, a second plurality of attribute field controls, such as attribute field controls 70 or 81 are displayed in response to receiving the second activation input. At step 3120, at least one of the attribute field controls (70, 81) receives a second manipulation action. At step 3130, in response to the second manipulation action, a second value associated with the second attribute is changed. At step 3140, the list 200 is scrolled or filtered in the viewing area 102 of the touchscreen display 45 based on the second changed value of the second attribute.

Although the methods presented in the present disclosure discuss using area interaction with certain applications, area interaction may be used at the graphical operating system level as well. For example, area interaction may be applied to a home screen of a graphical operating system to perform one of the following actions: reorganize icons, resize icons, invoke a screensaver, or any other suitable action applicable to a home screen.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method performed by an electronic device having a touchscreen display including a viewing area, comprising:
    the viewing area having a scrubber and an around scrubber area (ASA) rendered thereon near a one edge of the touchscreen display; and
    the viewing area having an attribute selection view, comprising a plurality of attribute selection elements, rendered along an opposite edge of the touchscreen display;
    activating a first attribute associated with at least one element of a list of elements having a visible list portion rendered on the viewing area, in response to receiving a first activation input for the first attribute, the first activation input comprising a swipe from the around scrubber area towards an attribute selection element, the first attribute being activated when the swipe reaches a selection distance threshold line;
    displaying a first plurality of attribute field controls associated with the first attribute, on the viewing area, in response to activating the first attribute;
    receiving a first manipulation action of at least one attribute field control of the first plurality of attribute field controls;
    updating a first attribute value in response to the first manipulation action; and
    updating the visible list portion based on the first attribute value.

2. The method of claim 1, wherein:
    the first attribute is an ordinal attribute;
    updating the first attribute value comprises incrementing or decrementing the first attribute value; and
    updating the visible list portion comprises scrolling the viewing area until the visible list portion contains elements matching the first attribute value.

3. The method of claim 2, wherein:
    the first manipulation action comprises swiping upwardly or downwardly in relation to the attribute field control.

4. The method of claim 1, wherein:
    the first attribute is a nominal attribute;
    the first plurality of field controls each contains a possible value for the first attribute;
    updating the first attribute value comprises setting the first attribute value to the possible value of the attribute field control receiving the manipulation action; and
    updating the visible list portion comprises displaying only elements of the visible list portion which have the first attribute value.

5. The method of claim 4, wherein:
    the first manipulation action comprises swiping to an attribute field control then lifting off therefrom.

6. The method of claim 1, further comprising:
    activating a second attribute associated with at least one element of the list of elements in response to receiving a second activation input for the second attribute;
    displaying a second plurality of attribute field controls associated with the second attribute, on the viewing area, in response to activating the second attribute;
    receiving a second manipulation action of at least one attribute field control of the second plurality of attribute field controls;
    updating a second attribute value in response to the second manipulation action; and
    updating the visible list portion based on the first attribute value and the second attribute value.

7. A method performed by an electronic device having a touchscreen display including a viewing area, comprising:
    the viewing area having an attribute activation view comprising a plurality of attribute activation elements, rendered along an edge of the touchscreen display;
    activating a first attribute associated with at least one element of a list of elements having a visible list portion rendered on the viewing area, in response to receiving a first activation input for the first attribute, the first activation input comprising touching an attribute activation element corresponding to the first attribute then swiping away from attribute activation view;
    displaying a first plurality of attribute field controls associated with the first attribute, on the viewing area, in response to activating the first attribute;
    receiving a first manipulation action of at least one attribute field control of the first plurality of attribute field controls;
    updating a first attribute value in response to the first manipulation action; and
    updating the visible list portion based on the first attribute value.

8. The method of claim 7, wherein the attribute activation view is semi-oval and is rendered in response to touching a scrubber.

9. The method of claim 7, wherein:
    the activation elements are scrollable in the vertical direction in response to touch flicks; and
    the viewing area has a scrubber rendered thereon, the scrubber being aligned with one the plurality of attribute activation elements.

10. A method performed by an electronic device having an augmented reality display including a viewing area, comprising:
    a scrubber rendered on the viewing area;
    activating a first attribute associated with at least one element of a list of elements having a visible list portion rendered on the viewing area, in response to receiving a first activation input for the first attribute, the first activation input comprising:
        a pinch and grab air gesture of the scrubber to expand the scrubber into an attribute activation view comprising a plurality of attribute activation elements; and
        swiping in mid-air towards an attribute activation element of the plurality of attribute activation elements;
    displaying a first plurality of attribute field controls associated with the first attribute, on the viewing area, in response to activating the first attribute;
    receiving a first manipulation action of at least one attribute field control of the first plurality of attribute field controls;

updating a first attribute value in response to the first manipulation action; and updating the visible list portion based on the first attribute value.

11. An electronic device comprising:
a touchscreen display including a viewing area on which there is rendered a visible list portion of a list of elements, the viewing area having a scrubber and an around scrubber area (ASA) rendered thereon near a one edge of the touchscreen display; and
the viewing area having an attribute selection view, comprising a plurality of attribute selection elements, rendered along an opposite edge of the touchscreen display;
a processing device operatively coupled to the touchscreen display; and
a non-transitory memory coupled to the processing device and storing software instructions that when executed by the processing device configure the processing device to:
activate a first attribute associated with a least one element of the list of elements in response to receiving a first activation input comprising a swipe from the around scrubber area towards an attribute selection element;
display a first plurality of attribute field controls associated with the first attribute, on the viewing area, in response to activating the first attribute;
receive a first manipulation action of at least one attribute field control of the first plurality of attribute field controls;
update a first attribute value in response to the first manipulation action; and
update the visible list portion based on the first attribute value.

12. The electronic device of claim 11, wherein:
the first attribute is an ordinal attribute; and
the instructions further configure the processing device to:
update the first attribute value comprises incrementing or decrementing the first attribute value; and
update the visible list portion comprises scrolling the viewing area until the visible list portion contains elements matching the first attribute value.

13. The electronic device of claim 11, wherein:
the first attribute is a nominal attribute;
the first plurality of field controls each contains a possible value for the first attribute; and the instructions further configure the processing device to:
update the first attribute value comprises setting the first attribute value to the possible value of the attribute field control receiving the manipulation action; and
update the visible list portion comprises displaying only elements of the visible list portion which have the first attribute value.

14. The electronic device of claim 11, wherein the instructions further configure the processing device to:
activate a second a second attribute associated with at least one element of the list of elements in response to receiving a second activation input for the second attribute;
display a second plurality of attribute field controls associated with the second attribute, on the viewing area, in response to activating the second attribute;
receive a second manipulation action of at least one attribute field control of the second plurality of attribute field controls;
update a second attribute value in response to the second manipulation action; and
update the visible list portion based on the first attribute value and the second attribute value.

15. An electronic device comprising:
a touchscreen display including a viewing area on which there is rendered a visible list portion of a list of elements, the viewing area having an attribute activation view comprising a plurality of attribute activation elements, rendered thereon near a one edge of the touchscreen display;
a processing device operatively coupled to the touchscreen display; and
a non-transitory memory coupled to the processing device and storing software instructions that when executed by the processing device configure the processing device to:
activate a first attribute associated with a least one element of the list of elements in response to receiving a first activation input comprising touching an attribute activation element corresponding to the first attribute then swiping away from attribute activation view.

16. The electronic device of claim 15, wherein:
the activation elements are scrollable in the vertical direction in response to touch flicks; and
the viewing area has a scrubber rendered thereon, the scrubber being aligned with one the plurality of attribute activation elements.

* * * * *